(12) United States Patent
Dooley et al.

(10) Patent No.: US 9,713,894 B2
(45) Date of Patent: Jul. 25, 2017

(54) SYSTEM, METHOD AND APPARATUS FOR PRODUCING A MULTI-LAYER, MICROCAPILLARY FILM

(75) Inventors: Joseph Dooley, Midland, MI (US); Thomas J. Parsons, Freeland, MI (US); Franklin J. Flavin, Midland, MI (US); Ronald K. Jenkins, Midland, MI (US); Eric L. Marchbanks, Sanford, MI (US); Rudolf J. Koopmans, Einsiedein (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/410,129

(22) PCT Filed: Jun. 28, 2012

(86) PCT No.: PCT/US2012/044642
§ 371 (c)(1),
(2), (4) Date: Dec. 22, 2014

(87) PCT Pub. No.: WO2014/003761
PCT Pub. Date: Jan. 3, 2014

(65) Prior Publication Data
US 2015/0321409 A1   Nov. 12, 2015

(51) Int. Cl.
*B29C 47/14* (2006.01)
*B29C 47/00* (2006.01)
(Continued)

(52) U.S. Cl.
CPC ............ *B29C 47/14* (2013.01); *B29C 44/468* (2013.01); *B29C 47/0021* (2013.01);
(Continued)

(58) Field of Classification Search
CPC ..... B29C 47/14; B29C 47/30; B29C 47/0021; B29C 47/0028
(Continued)

(56) References Cited

U.S. PATENT DOCUMENTS

| 3,557,265 A | 1/1971 | Chisholm et al. |
| 3,941,550 A | 3/1976 | Marion |

(Continued)

FOREIGN PATENT DOCUMENTS

| CA | 2740544 | 12/2011 |
| DE | 4326232 | 2/1995 |

(Continued)

OTHER PUBLICATIONS

EP Response to Office Action dated Jun. 30, 2015; from EP counterpart Application No. 12737657.2.
(Continued)

*Primary Examiner* — Alison L Hindenlang
*Assistant Examiner* — Mohamed K Ahmed Ali
(74) *Attorney, Agent, or Firm* — Dinsmore & Shohl LLP

(57) ABSTRACT

The instant disclosure provides a die assembly for producing microcapillary film. The die assembly is operatively connectable to an extruder having a thermoplastic material passing therethrough. The die assembly includes a pair of die plates, a manifold, and a plurality of nozzles. The manifold is positionable between the pair of die plates and defining a plurality of film channels therebetween. The plurality of film channels converge into an elongate outlet. The thermoplastic material is extrudable through the plurality of film channels and the elongate outlet to form a multi-layer film. The plurality of nozzles are positionable between the plurality of film channels. The plurality of nozzles are operatively connectable to a source of channel fluid for emitting the channel fluid into the thermoplastic
(Continued)

materials exiting the die whereby microcapillaries are formed.

18 Claims, 23 Drawing Sheets

(51) Int. Cl.
| | | |
|---|---|---|
| *B29C 47/30* | (2006.01) | |
| *B29C 47/06* | (2006.01) | |
| *B29C 47/10* | (2006.01) | |
| *B29C 44/46* | (2006.01) | |
| *B32B 27/08* | (2006.01) | |
| *B32B 27/20* | (2006.01) | |
| *B32B 27/32* | (2006.01) | |
| *B32B 27/34* | (2006.01) | |
| *B32B 3/26* | (2006.01) | |
| *B29L 7/00* | (2006.01) | |

(52) U.S. Cl.
CPC ........ *B29C 47/0028* (2013.01); *B29C 47/065* (2013.01); *B29C 47/109* (2013.01); *B29C 47/1063* (2013.01); *B29C 47/1072* (2013.01); *B29C 47/1081* (2013.01); *B29C 47/145* (2013.01); *B29C 47/30* (2013.01); *B32B 3/266* (2013.01); *B32B 27/08* (2013.01); *B32B 27/20* (2013.01); *B32B 27/32* (2013.01); *B32B 27/34* (2013.01); *B29L 2007/008* (2013.01)

(58) Field of Classification Search
USPC .............................................. 425/382 R, 464
See application file for complete search history.

(56) References Cited

U.S. PATENT DOCUMENTS

| | | | |
|---|---|---|---|
| 3,959,431 A | 5/1976 | Nissel | |
| 4,152,387 A | 5/1979 | Cloeren | |
| 4,171,195 A | 10/1979 | Klein et al. | |
| 4,182,603 A | 1/1980 | Knittel | |
| 4,221,624 A | 9/1980 | Eslinger et al. | |
| 4,280,801 A | 7/1981 | Wheeler, Jr. et al. | |
| 4,533,308 A | 8/1985 | Cloeren | |
| 4,669,965 A * | 6/1987 | Murakami ............ | B29C 47/065 264/173.12 |
| 4,687,956 A | 8/1987 | Itoh | |
| 4,723,902 A | 2/1988 | Erickson | |
| 4,818,464 A * | 4/1989 | Lau .......................... | D04H 1/56 156/167 |
| 5,076,776 A | 12/1991 | Yamada et al. | |
| 5,316,583 A | 5/1994 | Milliman | |
| 5,538,411 A | 7/1996 | Gates | |
| 5,655,835 A | 8/1997 | Pham et al. | |
| 5,665,164 A | 9/1997 | Milliman | |
| 5,690,972 A | 11/1997 | Planeta et al. | |
| 5,716,650 A | 2/1998 | Mavridis | |
| 5,984,657 A | 11/1999 | Bentivoglio | |
| 6,062,719 A | 5/2000 | Busby et al. | |
| 6,447,875 B1 * | 9/2002 | Norquist ............. | A61F 13/0206 428/107 |
| 7,714,072 B2 | 5/2010 | Michie, Jr. et al. | |
| 7,897,093 B2 | 3/2011 | Jones et al. | |
| 2004/0224156 A1 | 11/2004 | Wu | |
| 2005/0046090 A1 * | 3/2005 | Allen ...................... | D01D 4/06 264/555 |
| 2006/0003043 A1 | 1/2006 | Nagai et al. | |
| 2006/0210663 A1 | 9/2006 | Castillo | |
| 2007/0172536 A1 | 7/2007 | Mahler et al. | |
| 2008/0138598 A1 | 6/2008 | Michel et al. | |
| 2009/0011182 A1 | 1/2009 | Mackley et al. | |
| 2009/0152759 A1 | 6/2009 | Malone et al. | |
| 2010/0215879 A1 | 8/2010 | Dooley et al. | |
| 2011/0014482 A1 | 1/2011 | Zhu et al. | |
| 2011/0020574 A1 | 1/2011 | Mackley et al. | |
| 2013/0009336 A1 * | 1/2013 | Ausen .................. | B29C 33/301 264/177.1 |

FOREIGN PATENT DOCUMENTS

| | | | |
|---|---|---|---|
| EP | 0978366 | 2/2000 | |
| JP | 51080362 | 7/1976 | |
| JP | 08300435 | 11/1996 | |
| JP | 2006248023 | 9/2006 | |
| JP | 2010274436 | 12/2010 | |
| WO | 9109355 | 6/1991 | |
| WO | WO 0108866 | 2/2001 | |
| WO | 0206047 | 1/2002 | |
| WO | 03024691 | 3/2003 | |
| WO | 2008044122 | 4/2008 | |
| WO | 2010096608 | 8/2010 | |
| WO | 2011025698 | 3/2011 | |
| WO | WO 2011119323 A1 * | 9/2011 | ........... B29C 33/301 |
| WO | 2012094315 | 7/2012 | |
| WO | 2012094317 | 7/2012 | |
| WO | 2013009538 | 1/2013 | |
| WO | 2013096714 | 6/2013 | |
| WO | 2013149176 | 10/2013 | |
| WO | 2014003761 | 1/2014 | |

OTHER PUBLICATIONS

EPO Rule 161/162 Communication dated Feb. 6, 2015 for counterpart EPO Application No. 12737657.2; 2 pages.
International Search Report for PCT Patent Application No. PCT/US2012/045393 dated Jan. 22, 2013, 2 pages.
International Search Report for PCT Patent Application No. PCT/US2012/044642 dated Feb. 28, 2013, 3 pages.
International Search Report for PCT Patent Application No. PCT/US2012/044635 dated Mar. 25, 2013, 5 pages.
International Preliminary Report on Patentability for PCT Patent Application No. PCT/US2012/044635 dated Dec. 31, 2014, 7 pages.
Chinese Office Action dated Mar. 3, 2016; from Chinese counterpart Application No. 201280075509.1.
EP Response to Office Action dated Apr. 13, 2016; from EP counterpart Application No. 12737657.2.
JP2007-514566 Machine translation of abstract and claims, 4 pages.
Japanese Office Action dated Jan. 5, 2016, English Translation, for Japanese Application No. 2015-520140, 5 pages.
EP Office Action dated Jun. 21, 2016; from EP counterpart Application No. 12737657.2.
Chinese Response to Office Action dated Jul. 14, 2016; from Chinese counterpart Application No. 201280075509.1.
B. Hallmark et al.; "Hollow Microcapillary Arrays in Thin Plastic Films," Advanced Engineering Materials, vol. 7, No. 6, Jun. 1, 2005, pp. 545-547.
Chinese Office Action received Dec. 1, 2016; from counterpart Chinese Application No. 201280075509.1.
Japanese Office Action received Oct. 14, 2016; from Japanese counterpart Application No. 2015-520140.

\* cited by examiner

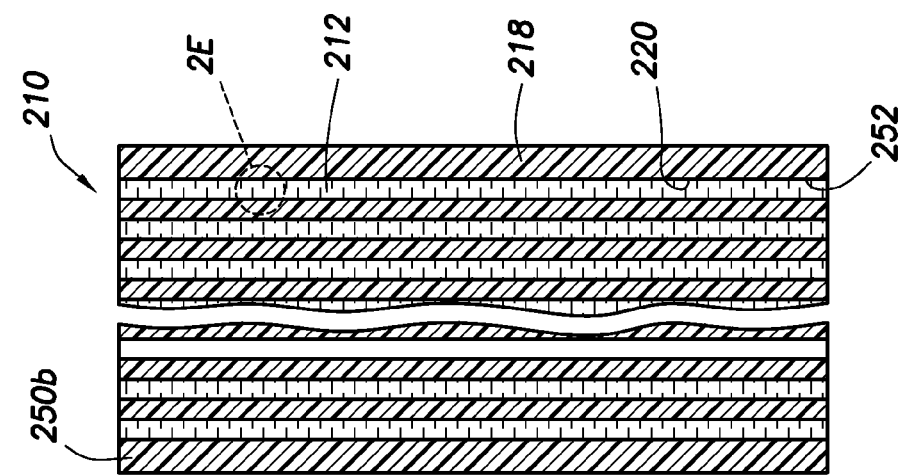
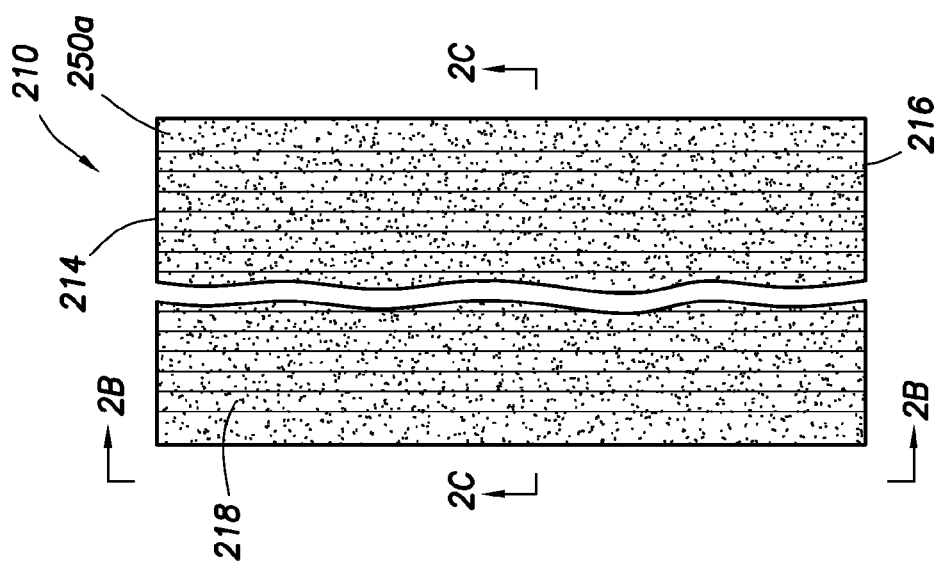
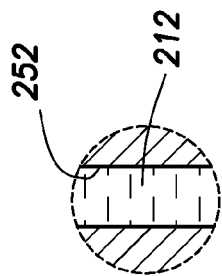

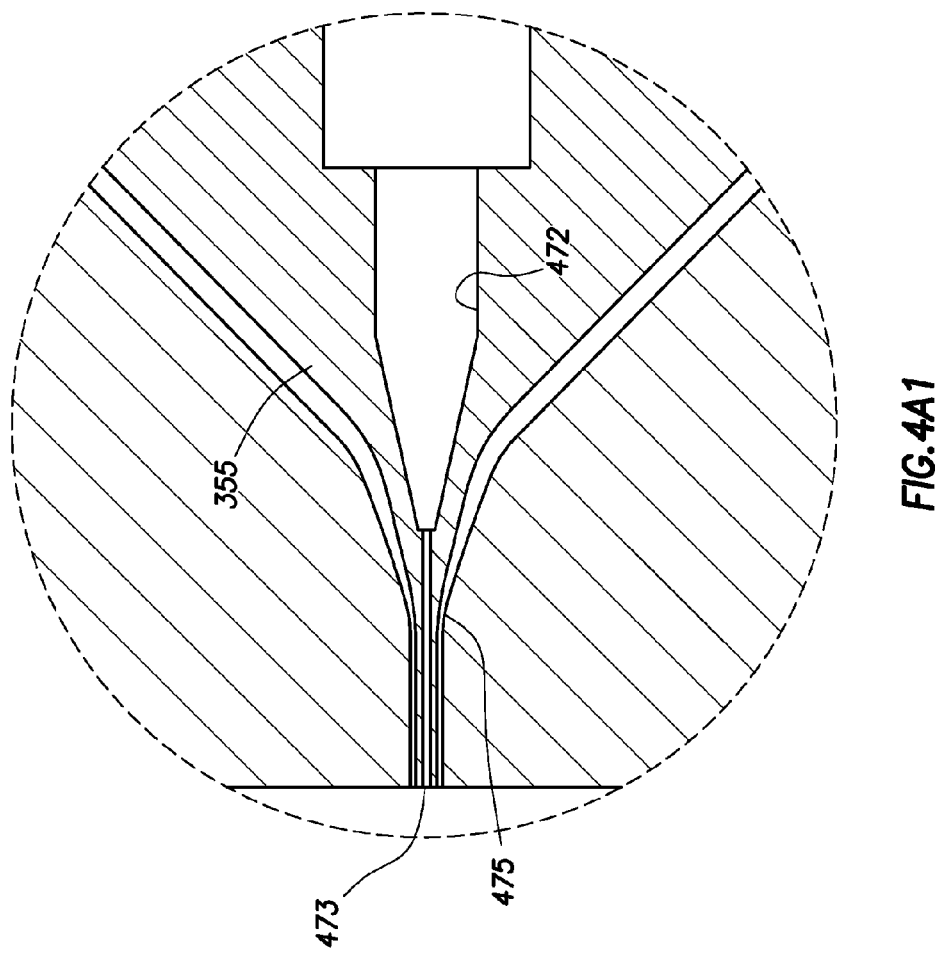
FIG. 4A1

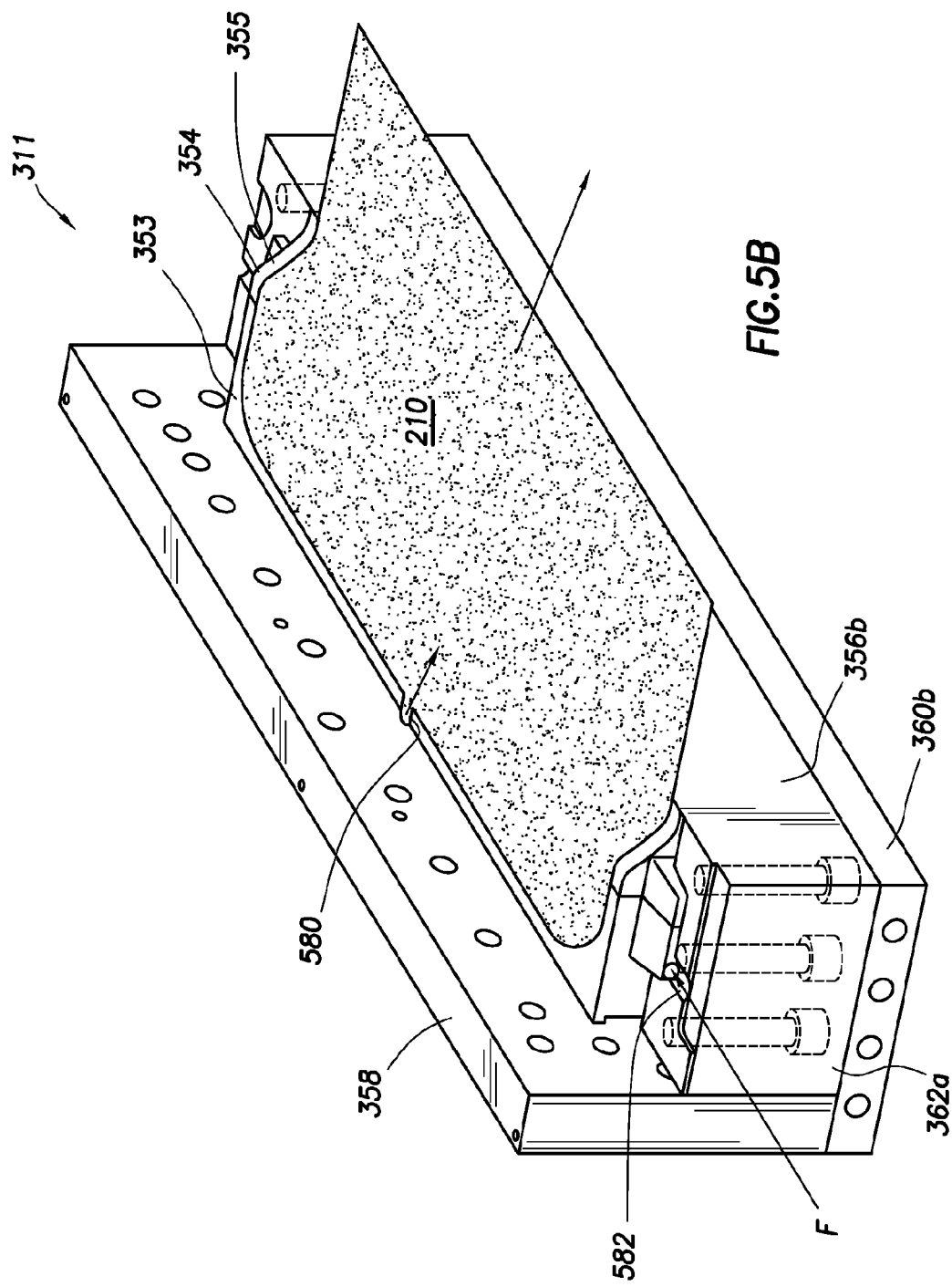

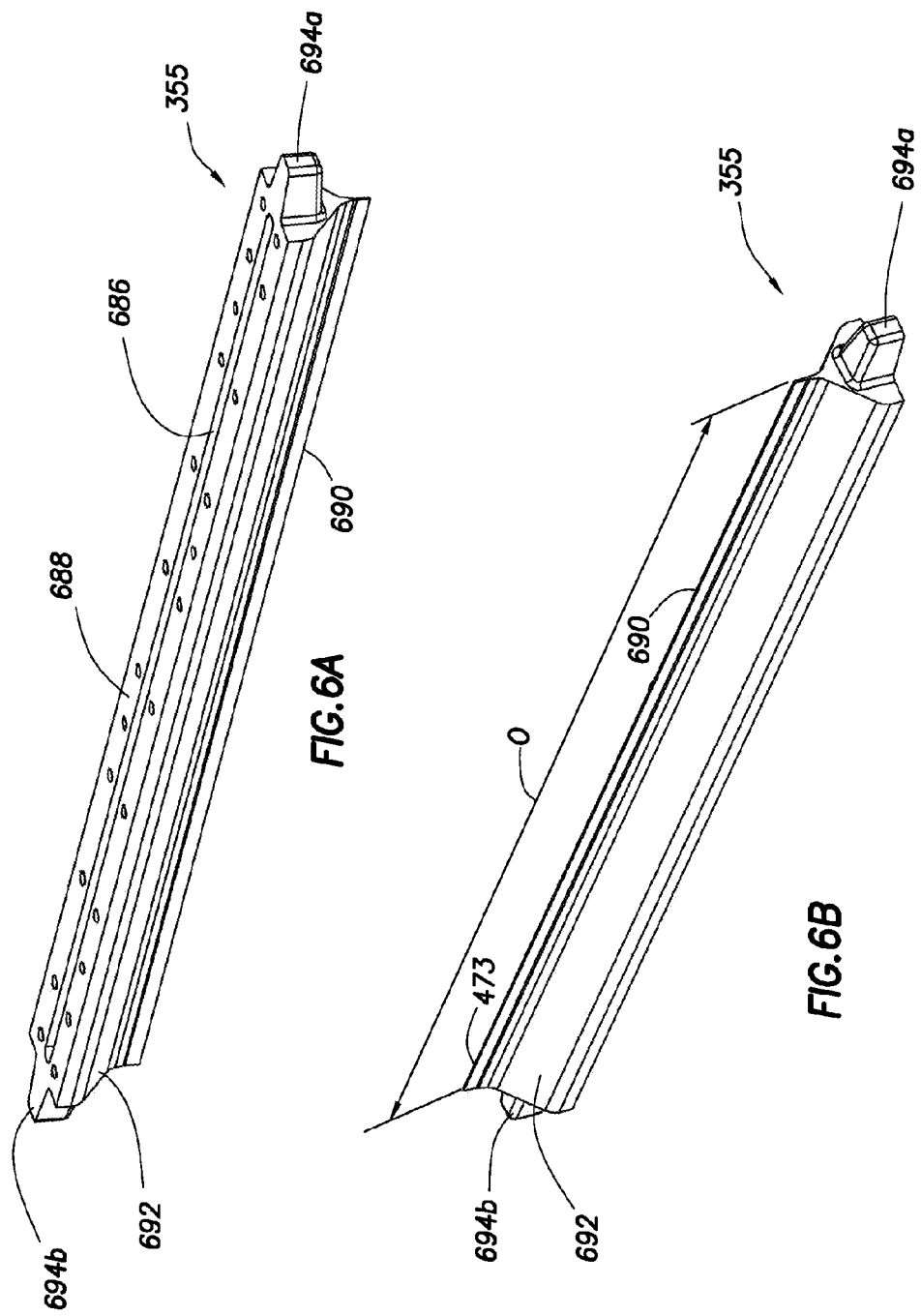

SYSTEM, METHOD AND APPARATUS FOR PRODUCING A MULTI-LAYER, MICROCAPILLARY FILM

BACKGROUND

The instant disclosure relates generally to a system, method and apparatus for producing a multi-layer, microcapillary film.

Polymers may be formed into films for separating, holding or containing items. Such films (or sheets) may be used, for example, as plastic bags, wraps, coatings, etc.

Polymeric material, e.g. polyolefins, may be formed into polymeric films via an extruder at increased temperatures and pressures. The extruder typically has one or more screws, e.g. single screw extruder or twin screw extruder. The polymer is forced out of the extruder through a die and formed into a film. The die may have a profile (or shape) used to define the shape of the extrudate or film as it exits the die.

Despite research efforts in film forming techniques, there is still a need for producing new microcapillary containing extrudate designs having improved properties. Furthermore, there is still a need for new die design facilitating the production of microcapillary containing extrudate having improved properties.

SUMMARY

In at least one aspect, the disclosure relates to a die assembly for producing a film, the die assembly operatively connectable to an extruder having a thermoplastic material passing therethrough. The terms 'film' and 'film or foam' as used herein encompass films, sheets, foams, profiles and/or other extrudates. The die assembly is provided with a pair of die plates, a manifold and a plurality of nozzles. The manifold is positionable between the pair of die plates and defines a plurality of film channels therebetween. The plurality of film channels converge into an elongate outlet. The thermoplastic material is extrudable through the plurality of film channels and the elongate outlet to form a multi-layer film. The plurality of nozzles is positionable between the plurality of film channels. The plurality of nozzles may be operatively connectable to a source of channel fluid for emitting the channel fluid between layers of the multi-layer film whereby microcapillaries are formed in the multi-layer film.

The pair of die plates and the manifold may be shaped to define the flow channels such that thermoplastic material is selectively distributed therethrough whereby a desired flow of the thermoplastic material passes through the elongate outlet. The thermoplastic material may be provided with at least one matrix thermoplastic material extrudable through the plurality of film channels. The die assembly may also be provided with at least one thermoplastic material inlet in fluid communication with the plurality of flow channels. The manifold may have a separate or integral manifold intake and manifold outtake.

The plurality of nozzles may be positionable about an exit end of the manifold outtake. The plurality of nozzles may be linearly positionable about the elongate outlet. The manifold may have a channel fluid passage in fluid communication with the plurality of nozzles for passing the channel fluid therethrough. Each of the pair of die plates may have a manifold receptacle for receiving the manifold. The plurality of flow channels may have the same shape and/or different shapes. The elongate outlet may have a width of at least 3 inches (7.62 cm). The die assembly may also be provided with at least one plate about an outer surface thereof.

In another aspect, the disclosure relates to an extruder for producing a thermoplastic material film. The extruder is provided with a housing having an inlet for receiving a thermoplastic material, a driver positionable in the housing and advancing the thermoplastic material through the housing, and the die assembly.

The driver applies heat to the thermoplastic material in the housing and pressure to the thermoplastic material in the housing. The extruder may also be provided with a hopper for collecting and distributing the thermoplastic material through the inlet and/or electronics for operating the extruder. The driver may be at least one screw rotationally positionable in the housing.

In another aspect, the present disclosure relates to a method for producing a multi-layer, microcapillary film. The method involves passing a thermoplastic material into an extruder, passing the thermoplastic material through the die assembly operatively connectable to an outlet of the extruder, forming a multi-layer film by extruding the thermoplastic material through the plurality of film channels and the elongate outlet, and forming microcapillaries in the multi-layer film by emitting the channel fluid between layers of the multi-layer film with the plurality of nozzles. The channel fluid may include air, gas, one or more phase change materials, and/or one or more thermoplastic materials.

The method may also involve selectively distributing the thermoplastic material through the plurality of flow channels such that a desired flow of the thermoplastic material passes through the elongate outlet. The thermoplastic material may also have a plurality of thermoplastic materials. Forming the multi-layer film may involve forming the multi-layer film by extruding the plurality of thermoplastic materials through the plurality of film channels. The method may also involve selectively adjusting a profile of the multi-layer film by manipulating temperature, flow rate, pressure, and/or material properties of the thermoplastic material. A film containing microcapillaries may be produced by the method.

Finally, in at least one aspect, the disclosure relates to a multi-layer microcapillary film provided with a sheet of material having a plurality of layers of thermoplastic material, at least one of the plurality of layers of thermoplastic material having a different material from at least one other of the plurality of layers of thermoplastic material. The sheet of material has a plurality of channels disposed in parallel between the plurality of layers of thermoplastic material.

The film may also have a channel fluid disposed in the plurality of channels. The channel fluid may be selected from a group consisting of air, gas, one or more thermoplastic materials, one or more phase change materials and combinations thereof. The thermoplastic material may be different from the matrix thermoplastic material and/or the channel fluid. The sheet of material has a width in the range of at least 3 inches (7.62 cm), and a thickness in the range of from 10 µm to 2000 µm. The plurality of channels may be at least 50 µm apart from each other and/or have a width in the range of at least 50 µm. The plurality of layers of thermoplastic material has a different shape from at least one other of the plurality of layers of thermoplastic material. The thermoplastic material may be a polyolefin such as polyethylene or polypropylene, and/or polyamide such as nylon 6.

The plurality of channels may have a cross sectional shape of circular, rectangular, oval, star, diamond, triangular, square, and/or the like. A multilayer structure and/or an article may include the film containing microcapillaries, and optionally one or more substrates associated therewith.

In an alternative embodiment, the instant disclosure provides a die, extruder, process for making films, films and/or articles made therefrom, and method of making such articles, in accordance with any of the preceding embodiments.

BRIEF DESCRIPTION OF THE DRAWINGS

For the purpose of illustrating the disclosure, there is shown in the drawings a form that is exemplary; it being understood, however, that this disclosure is not limited to the precise arrangements and instrumentalities shown.

FIG. 2A is a longitudinal-sectional view of an inventive microcapillary film;

FIGS. 2B-2C are various cross-sectional views of an inventive microcapillary film;

FIG. 2E is a segment 2E of a longitudinal sectional view of the inventive microcapillary film, as shown in FIG. 2B;

FIG. 4A1 is a detailed view of a portion 4A1 of the die assembly of FIG. 4A;

FIG. 5A-5F are various views of a portion of a die assembly;

FIGS. 6A-6F are various views of a portion of a manifold outtake;

DETAILED DESCRIPTION

The description that follows includes exemplary apparatus, methods, techniques, and/or instruction sequences that embody techniques of the present subject matter. However, it is understood that the described embodiments may be practiced without these specific details.

The present disclosure relates to die assemblies and extruders for producing films having multiple layers of thermoplastic material, an elongate profile, and microcapillaries. The die assembly includes a manifold positioned between dies for extruding multiple layers of thermoplastic material, and nozzles for providing a channel fluid between such layers as the layers are extruded as will be described more fully herein.

Figure 1:
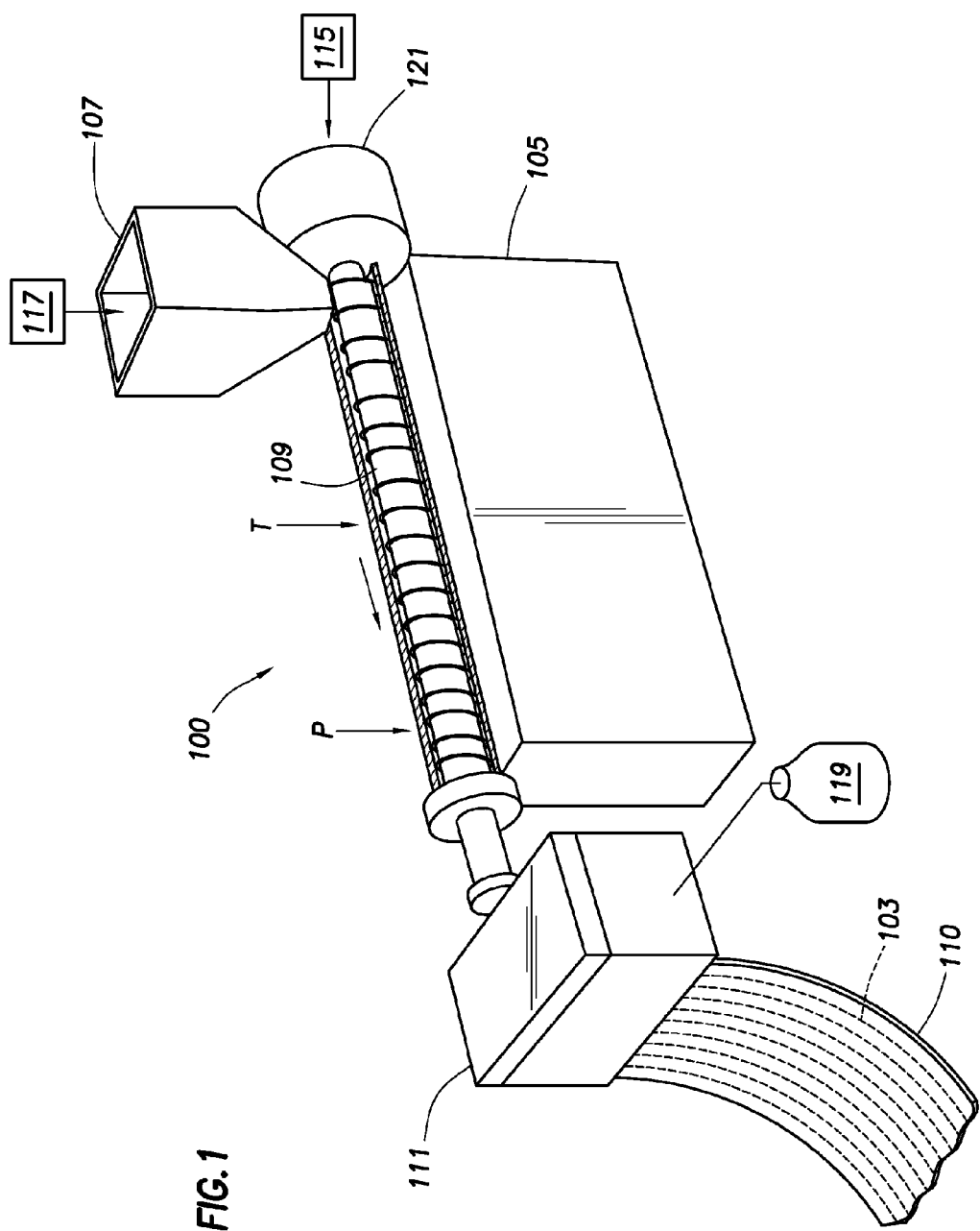
FIG. 1 is a perspective view, partially in cross-section, of an extruder with a die assembly for manufacturing a microcapillary film.

FIG. 1 depicts an example extruder (100) used to form a multi-layer polymeric film (110) with microcapillaries (103). The extruder (100) includes a material housing (105), a material hopper (107), a screw (109), a die assembly (111) and electronics (115). The extruder (100) is shown partially in cross-section to reveal the screw (109) within the material housing (105). While a screw type extruder is depicted, a variety of extruders (e.g., single screw, twin screw, etc.) may be used to perform the extrusion of the material through the extruder (100) and die assembly (111). One or more extruders may be used with one or more die assemblies. Electronics (115) may include, for example, controllers, processors, motors and other equipment used to operate the extruder.

Raw materials, e.g. thermoplastic materials, (117) are placed into the material hopper (107) and passed into the housing (105) for blending. The raw materials (117) are heated and blended by rotation of the screw (109) rotationally positioned in the housing (105) of the extruder (100). Motor (121) may be provided to drive the screw (109) or other driver to advance the material. Heat and pressure are applied as schematically depicted from a heat source H and a pressure source P (e.g., the screw (109)), respectively, to the blended material to force the material through the die assembly (111) as indicated by the arrow. The raw materials are melted and conveyed through the extruder (100) and die assembly (111). The molten thermoplastic material (117) passes through die assembly (111), and is formed into the desired shape and cross section (referred to herein as the 'profile'). The die assembly (111) may be configured to extrude the molten thermoplastic material (117) into thin sheets of the multi-layered polymeric film (110) as is described further herein. A channel fluid source (119) is provided to emit channel fluid through the die assembly (111) and between layers of the multilayered polymeric film (110) as it is extruded.

Multi-Layer Microcapillary Film

FIGS. 2A-2F depict various views of a multi-layered film (210) which may be produced, for example, by the extruder (100) and die assembly (112) of FIG. 1. As shown in these figures, the multi-layered film (210) is a microcapillary film. The multi-layered film (210) is depicted as being made up of multiple layers (250a,b) of thermoplastic material. The film (210) also has channels (220) positioned between the layers (250a,b).

Figure 2C:
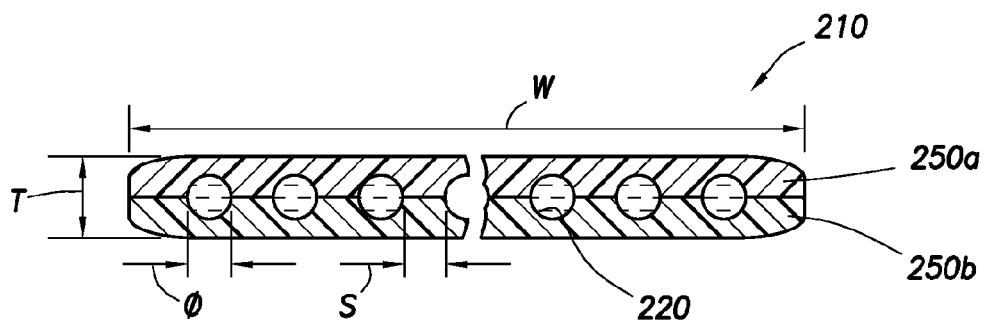
Figure 2D:
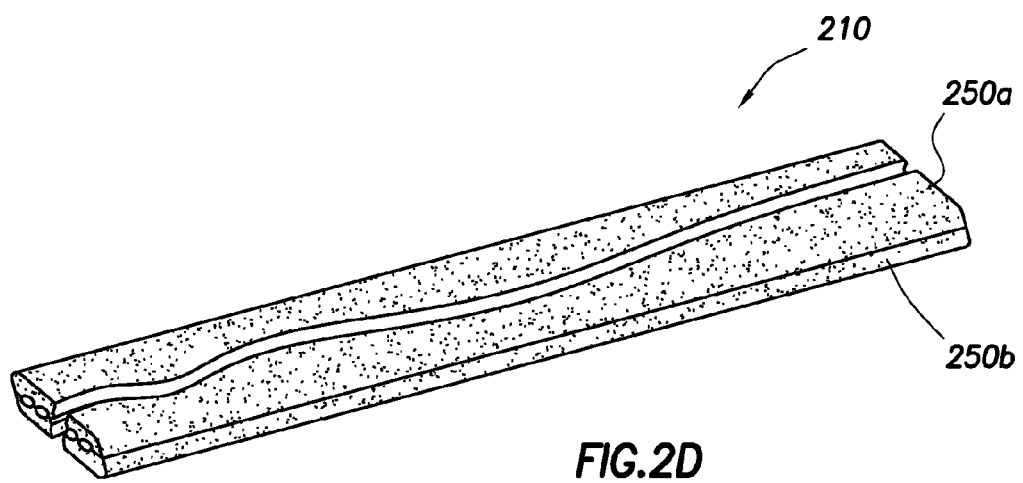
FIG. 2D is an elevated view of an inventive microcapillary film.
Figure 2F:
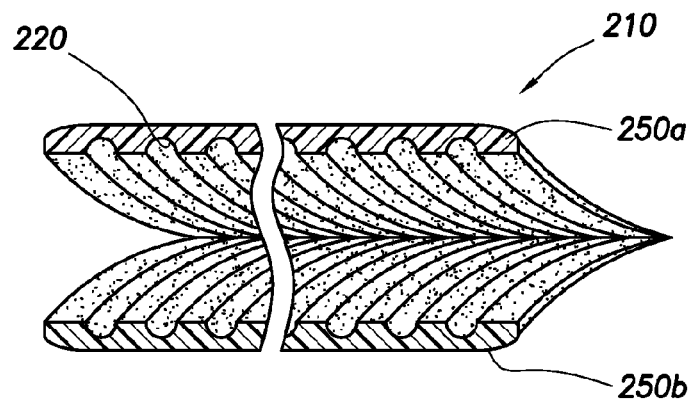
FIG. 2F is an exploded view of an inventive microcapillary film.

The multi-layered film (210) may also have an elongate profile as shown in FIG. 2C. This profile is depicted as having a wide width W relative to its thickness T. The width W may be in the range of from about at least 3 inches (7.62 cm) to about 60 inches (152.40 cm) and may be, for example, about 24 inches (60.96 cm) in width, or in the range of from about 20 to about 40 inches (50.80-101.60 cm), or in the range of from about 20 to about 50 inches (50.80-127 cm), etc. The thickness T may be in the range of from about 10 to about 2000 µm (e.g., from about 250 to about 2000 µm). The channels (220) may have a dimension ϕ (e.g., a width or diameter) in the range of from about 50 to about 500 µm (e.g., from about 100 to about 500 µm), and have a spacing S between the channels (220) in the range of from about 50 to about 500 µm (e.g., from about 100 to about 500 µm). As further described below, the selected dimensions may be proportionally defined. For example, the hole dimension ϕ may be a diameter of about 30% of the selected thickness T.

As shown, layers (250a,b) are made of a matrix thermoplastic material and channels (220) have a channel fluid therein. The channel fluid may comprise, for example, various materials, such as air, gas, polymers, etc., as will be described further herein. Each layer (250a,b) of the multi-layered film (210) may be made of various polymers, such as those described further herein. Each layer may be made of the same material or of a different material. While only two layers (250a,b) are depicted, the multi-layered film (210) may have any number of layers of material.

Channels (220) may be positioned between one or more sets of layers. A channel fluid (212) may be provided in the channels (220). Various numbers of channels (220) may be provided as desired. The multiple layers may also have the same or different profiles (or cross-sections). The characteristics, such as shape of the layers (250a,b) and/or channels (220) of the multi-layered film (210), may be defined by the configuration of the die assembly used to extrude the thermoplastic material as will be described more fully herein.

In a given example, the film (210) may include (a) a matrix (218) comprising a matrix thermoplastic material; (b) at least one or more channels (220) are disposed in parallel in the matrix (218) along the microcapillary film or foam (210), wherein the one or more channels (220) are at least about 250 to about 500 μm apart from each other, and wherein each of the one or more channels (220) has a diameter (or width) in the range of at least about 100 to about 500 μm; and (c) a channel fluid (212) disposed in the one or more channels (220), wherein the channel fluid (212) is different than the matrix thermoplastic material (250a,b); and wherein said microcapillary film or foam (210) has a thickness in the range of from about 10 μm to about 2000 μm.

The microcapillary film or foam (210) may have a thickness in the range of from 10 μm to 2000 μm; for example, microcapillary film or foam (210) may have a thickness in the range of from 10 to 2000 μm; or in the alternative, from 100 to 1000 μm; or in the alternative, from 200 to 800 μm; or in the alternative, from 200 to 600 μm; or in the alternative, from 300 to 1000 μm; or in the alternative, from 300 to 900 μm; or in the alternative, from 300 to 700 μm. The film thickness to microcapillary diameter ratio is in the range of from 2:1 to 400:1.

The microcapillary film or foam (210) may comprise at least 10 percent by volume of the matrix (218), based on the total volume of the microcapillary film or foam (210); for example, the microcapillary film or foam (210) may comprise from 10 to 80 percent by volume of the matrix (218), based on the total volume of the microcapillary film or foam (210); or in the alternative, from 20 to 80 percent by volume of the matrix (218), based on the total volume of the microcapillary film or foam (210); or in the alternative, from 30 to 80 percent by volume of the matrix (218), based on the total volume of the microcapillary film or foam (210).

The microcapillary film or foam (210) may comprise from 20 to 90 percent by volume of voidage, based on the total volume of the microcapillary film or foam (210); for example, the microcapillary film or foam (210) may comprise from 20 to 80 percent by volume of voidage, based on the total volume of the microcapillary film or foam (210); or in the alternative, from 20 to 70 percent by volume of voidage, based on the total volume of the microcapillary film or foam (210); or in the alternative, from 30 to 60 percent by volume of voidage, based on the total volume of the microcapillary film or foam (210).

The microcapillary film or foam (210) may comprise from 50 to 100 percent by volume of the channel fluid (212), based on the total voidage volume, described above; for example, the microcapillary film or foam (210) may comprise from 60 to 100 percent by volume of the channel fluid (212), based on the total voidage volume, described above; or in the alternative, from 70 to 100 percent by volume of the channel fluid (212), based on the total voidage volume, described above; or in the alternative, from 80 to 100 percent by volume of the channel fluid (212), based on the total voidage volume, described above.

The inventive microcapillary film or foam (210) has a first end (214) and a second end (216). At least one or more channels (220) are disposed in parallel in the matrix (218) from the first end (214) to the second end (216). The one or more channels (220) may be, for example, at least about 250 μm apart from each other. The one or more channels (220) have a diameter in the range of at least about 250 μm; for example, from 250 μm to 1990 μm; or in the alternative, from 250 to 990 μm; or in the alternative, from 250 to 890 μm; or in the alternative, from 250 to 790 μm; or in the alternative, from 250 to 690 μm or in the alternative, from 250 to 590 μm. The one or more channels (220) may have a cross sectional shape selected from the group consisting of circular, rectangular, oval, star, diamond, triangular, square, the like, and combinations thereof. The one or more channels (220) may further include one or more seals at the first end (214), the second end (216), therebetween the first point (214) and the second end (216), and/or combinations thereof.

The matrix (218) comprises one or more matrix thermoplastic materials (250a,b). Such matrix thermoplastic materials (250a,b) include, but are not limited to, polyolefin, e.g. polyethylene and polypropylene; polyamide, e.g. nylon 6; polyvinylidene chloride; polyvinylidene fluoride; polycarbonate; polystyrene; polyethylene terephthalate; polyurethane and polyester. The matrix (218) may be reinforced via, for example, glass or carbon fibers and/or any other mineral fillers such as talc or calcium carbonate. Exemplary fillers include, but are not limited to, natural calcium carbonates, including chalks, calcites and marbles, synthetic carbonates, salts of magnesium and calcium, dolomites, magnesium carbonate, zinc carbonate, lime, magnesia, barium sulphate, barite, calcium sulphate, silica, magnesium silicates, talc, wollastonite, clays and aluminum silicates, kaolins, mica, oxides or hydroxides of metals or alkaline earths, magnesium hydroxide, iron oxides, zinc oxide, glass or carbon fiber or powder, wood fiber or powder or mixtures of these compounds.

Examples of matrix thermoplastic materials (250a,b) include, but are not limited to, homopolymers and copolymers (including elastomers) of one or more alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth) acrylic acid copolymers, and ethylene-(meth)acrylate copolymer; styrenic copolymers (including elastomers) such as polystyrene, ABS, acrylonitrile-styrene copolymer, α-methylstyrene-styrene copolymer, styrene vinyl alcohol, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polyvinylidene fluoride, polymethyl acrylate, and polymethyl methacrylate; polyamides such as nylon 6, nylon 6,6, and nylon 12; thermoplastic polyesters such as polyethylene terephthalate and polybutylene terephthalate; polyurethane, polycarbonate, polyphenylene oxide, and the like; and glassy hydrocarbon-based resins, including poly-dicyclopentadiene polymers and related polymers (copolymers, terpolymers); saturated mono-olefins such as vinyl acetate, vinyl propionate, vinyl versatate, and vinyl butyrate and the like; vinyl esters such as esters of monocarboxylic acids, including methyl acrylate, ethyl acrylate, n-butyl acrylate, isobutyl acrylate, 2-ethylhexyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, mixtures thereof; resins produced by ring opening metathesis and cross metathesis polymerization and the like. These resins may be used either alone or in combinations of two or more.

In selected embodiments, matrix thermoplastic materials (250a,b) may, for example, comprise one or more polyolefins selected from the group consisting of ethylene-alpha olefin copolymers, propylene-alpha olefin copolymers, and olefin block copolymers. In particular, in select embodiments, the matrix thermoplastic materials (250a,b) may comprise one or more non-polar polyolefins.

In specific embodiments, polyolefins such as polypropylene, polyethylene, copolymers thereof, and blends thereof, as well as ethylene-propylene-diene terpolymers, may be used. In some embodiments, exemplary olefinic polymers include homogeneous polymers; high density polyethylene (HDPE); heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers; and high pressure, free radical polymerized ethylene polymers and copolymers such as low density polyethylene (LDPE) or ethylene vinyl acetate polymers (EVA).

In one embodiment, the ethylene-alpha olefin copolymer may, for example, be ethylene-butene, ethylene-hexene, or ethylene-octene copolymers or interpolymers. In other particular embodiments, the propylene-alpha olefin copolymer may, for example, be a propylene-ethylene or a propylene-ethylene-butene copolymer or interpolymer.

In certain other embodiments, the matrix thermoplastic materials (250a,b) may, for example, be a semi-crystalline polymer and may have a melting point of less than 110° C. In another embodiment, the melting point may be from 25 to 100° C. In another embodiment, the melting point may be between 40 and 85° C.

In one particular embodiment, the matrix thermoplastic materials (250a,b) include a propylene/α-olefin interpolymer composition comprising a propylene/alpha-olefin copolymer, and optionally one or more polymers, e.g. a random copolymer polypropylene (RCP). In one particular embodiment, the propylene/alpha-olefin copolymer is characterized as having substantially isotactic propylene sequences. "Substantially isotactic propylene sequences" means that the sequences have an isotactic triad (mm) measured by 13C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refers to the isotactic sequence in terms of a triad unit in the copolymer molecular chain determined by 13C NMR spectra.

The propylene/alpha-olefin copolymer may have a melt flow rate in the range of from 0.1 to 500 g/10 minutes, measured in accordance with ASTM D-1238 (at 230° C./2.16 Kg). All individual values and subranges from 0.1 to 500 g/10 minutes are included herein and disclosed herein; for example, the melt flow rate can be from a lower limit of 0.1 g/10 minutes, 0.2 g/10 minutes, or 0.5 g/10 minutes to an upper limit of 500 g/10 minutes, 200 g/10 minutes, 100 g/10 minutes, or 25 g/10 minutes. For example, the propylene/alpha-olefin copolymer may have a melt flow rate in the range of from 0.1 to 200 g/10 minutes; or in the alternative, the propylene/alpha-olefin copolymer may have a melt flow rate in the range of from 0.2 to 100 g/10 minutes; or in the alternative, the propylene/alpha-olefin copolymer may have a melt flow rate in the range of from 0.2 to 50 g/10 minutes; or in the alternative, the propylene/alpha-olefin copolymer may have a melt flow rate in the range of from 0.5 to 50 g/10 minutes; or in the alternative, the propylene/alpha-olefin copolymer may have a melt flow rate in the range of from 1 to 50 g/10 minutes; or in the alternative, the propylene/alpha-olefin copolymer may have a melt flow rate in the range of from 1 to 40 g/10 minutes; or in the alternative, the propylene/alpha-olefin copolymer may have a melt flow rate in the range of from 1 to 30 g/10 minutes.

The propylene/alpha-olefin copolymer has a crystallinity in the range of from at least 1 percent by weight (a heat of fusion of at least 2 Joules/gram) to 30 percent by weight (a heat of fusion of less than 50 Joules/gram). All individual values and subranges from 1 percent by weight (a heat of fusion of at least 2 Joules/gram) to 30 percent by weight (a heat of fusion of less than 50 Joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram) to an upper limit of 30 percent by weight (a heat of fusion of less than 50 Joules/gram), 24 percent by weight (a heat of fusion of less than 40 Joules/gram), 15 percent by weight (a heat of fusion of less than 24.8 Joules/gram) or 7 percent by weight (a heat of fusion of less than 11 Joules/gram). For example, the propylene/alpha-olefin copolymer may have a crystallinity in the range of from at least 1 percent by weight (a heat of fusion of at least 2 Joules/gram) to 24 percent by weight (a heat of fusion of less than 40 Joules/gram); or in the alternative, the propylene/alpha-olefin copolymer may have a crystallinity in the range of from at least 1 percent by weight (a heat of fusion of at least 2 Joules/gram) to 15 percent by weight (a heat of fusion of less than 24.8 Joules/gram); or in the alternative, the propylene/alpha-olefin copolymer may have a crystallinity in the range of from at least 1 percent by weight (a heat of fusion of at least 2 Joules/gram) to 7 percent by weight (a heat of fusion of less than 11 Joules/gram); or in the alternative, the propylene/alpha-olefin copolymer may have a crystallinity in the range of from at least 1 percent by weight (a heat of fusion of at least 2 Joules/gram) to 5 percent by weight (a heat of fusion of less than 8.3 Joules/gram). The crystallinity is measured via DSC method. The propylene/alpha-olefin copolymer comprises units derived from propylene and polymeric units derived from one or more alpha-olefin comonomers. Exemplary comonomers utilized to manufacture the propylene/alpha-olefin copolymer are C2, and C4 to C10 alpha-olefins; for example, C2, C4, C6 and C8 alpha-olefins.

The propylene/alpha-olefin copolymer comprises from 1 to 40 percent by weight of one or more alpha-olefin comonomers. All individual values and subranges from 1 to 40 weight percent are included herein and disclosed herein; for example, the comonomer content can be from a lower limit of 1 weight percent, 3 weight percent, 4 weight percent, 5 weight percent, 7 weight percent, or 9 weight percent to an upper limit of 40 weight percent, 35 weight percent, 30 weight percent, 27 weight percent, 20 weight percent, 15 weight percent, 12 weight percent, or 9 weight percent. For example, the propylene/alpha-olefin copolymer comprises from 1 to 35 percent by weight of one or more alpha-olefin comonomers; or in the alternative, the propylene/alpha-olefin copolymer comprises from 1 to 30 percent by weight of one or more alpha-olefin comonomers; or in the alternative, the propylene/alpha-olefin copolymer comprises from 3 to 27 percent by weight of one or more alpha-olefin comonomers; or in the alternative, the propylene/alpha-olefin copolymer comprises from 3 to 20 percent by weight of one or more alpha-olefin comonomers; or in the alternative, the propylene/alpha-olefin copolymer comprises from 3 to 15 percent by weight of one or more alpha-olefin comonomers.

The propylene/alpha-olefin copolymer has a molecular weight distribution (MWD), defined as weight average molecular weight divided by number average molecular weight (Mw/Mn) of 3.5 or less; in the alternative 3.0 or less; or in another alternative from 1.8 to 3.0.

Such propylene/alpha-olefin copolymers are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™.

In one embodiment, the propylene/alpha-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a C4-10 α-olefin; and containing an average of at least 0.001, preferably an average of at least 0.005 and more preferably an average of at least 0.01, long chain branches/1000 total carbons. The maximum number of long chain branches in the propylene/alpha-olefin copolymer is not critical, but typically it does not exceed 3 long chain branches/1000 total carbons. The term long chain branch, as used herein with regard to propylene/alpha-olefin copolymers, refers to a chain length of at least one (1) carbon more than a short chain branch, and short chain branch, as used herein with regard to propylene/alpha-olefin copolymers, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. Such propylene/alpha-olefin copolymers are further described in details in the U.S. Provisional Patent Application No. 60/988,999 and International Patent Application No. PCT/US08/082599, each of which is incorporated herein by reference.

In certain other embodiments, the matrix thermoplastic material 11, e.g. propylene/alpha-olefin copolymer, may, for example, be a semi-crystalline polymer and may have a melting point of less than 110° C. In preferred embodiments, the melting point may be from 25 to 100° C. In more preferred embodiments, the melting point may be between 40 and 85° C.

In other selected embodiments, olefin block copolymers, e.g., ethylene multi-block copolymer, such as those described in the International Publication No. WO2005/090427 and U.S. Patent Application Publication No. US 2006/0199930, incorporated herein by reference to the extent describing such olefin block copolymers and the test methods for measuring those properties listed below for such polymers, may be used as the matrix thermoplastic materials (250a,b). Such olefin block copolymer may be an ethylene/α-olefin interpolymer:

(a) having a Mw/Mn from about 1.7 to about 3.5, at least one melting point, Tm, in degrees Celsius, and a density, d, in grams/cubic centimeter, wherein the numerical values of Tm and d corresponding to the relationship:

$$Tm > -2002.9 + 4538.5(d) - 2422.2(d)2; \text{ or}$$

(b) having a Mw/Mn from about 1.7 to about 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$$Re > 1481 - 1629(d); \text{ or}$$

(d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of about 1:1 to about 9:1.

Such olefin block copolymer, e.g. ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, Mw/Mn, greater than about 1.3; or (b) have an average block index greater than zero and up to about 1.0 and a molecular weight distribution, Mw/Mn, greater than about 1.3.

In one embodiment, matrix (218) may further comprise a blowing agent thereby facilitating the formation of a foam material. In one embodiment, the matrix may be a foam, for example a closed cell foam. In another embodiment, matrix (218) may further comprise one or more fillers thereby facilitating the formation of a microporous matrix, for example, via orientation, e.g. biaxial orientation, or cavitation, e.g. uniaxial or biaxial orientation, or leaching, i.e. dissolving the fillers. Such fillers include, but are not limited to, natural calcium carbonates, including chalks, calcites and marbles, synthetic carbonates, salts of magnesium and calcium, dolomites, magnesium carbonate, zinc carbonate, lime, magnesia, barium sulphate, barite, calcium sulphate, silica, magnesium silicates, talc, wollastonite, clays and aluminum silicates, kaolins, mica, oxides or hydroxides of metals or alkaline earths, magnesium hydroxide, iron oxides, zinc oxide, glass or carbon fiber or powder, wood fiber or powder or mixtures of these compounds.

The one or more channel fluids (212) may include a variety of fluids, such as air or other gases and channel thermoplastic material. The channel thermoplastic materials may be, but are not limited to, polyolefin, e.g. polyethylene and polypropylene; polyamide, e.g. nylon 6; polyvinylidene chloride; polyvinylidene fluoride; polycarbonate; polystyrene; polyethylene terephthalate; polyurethane and polyester. The matrix (218) may be reinforced via, for example, via glass or carbon fibers and/or any other mineral fillers such as talc or calcium carbonate. Exemplary fillers include, but are not limited to, natural calcium carbonates, including chalks, calcites and marbles, synthetic carbonates, salts of magnesium and calcium, dolomites, magnesium carbonate, zinc carbonate, lime, magnesia, barium sulphate, barite, calcium sulphate, silica, magnesium silicates, talc, wollastonite, clays and aluminum silicates, kaolins, mica, oxides or hydroxides of metals or alkaline earths, magnesium hydroxide, iron oxides, zinc oxide, glass or carbon fiber or powder, wood fiber or powder or mixtures of these compounds.

Examples of channel fluids (212) include, but are not limited to, homopolymers and copolymers (including elastomers) of one or more alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, α-methylstyrene-styrene copolymer, styrene vinyl alcohol, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polyvinylidene fluoride, polymethyl acrylate, and polymethyl methacrylate; polyamides such as nylon 6, nylon 6,6, and nylon 12; thermoplastic polyesters such as polyethylene terephthalate and polybutylene terephthalate; polyurethane; polycarbonate, polyphenylene oxide, and the like; and glassy hydrocarbon-based resins, including poly-dicyclopentadiene polymers and related polymers (copolymers, terpolymers); saturated mono-olefins such as vinyl acetate, vinyl propionate, vinyl versatate, and vinyl butyrate and the like; vinyl esters such as esters of monocarboxylic acids, including methyl acrylate, ethyl acrylate, n-butyl acrylate, isobutyl acrylate, 2-ethylhexyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, mixtures thereof; resins produced by ring opening metathesis and cross metathesis polymerization and the like. These resins may be used either alone or in combinations of two or more.

In selected embodiments, the channel fluid (212) may, for example, comprise one or more polyolefins selected from the group consisting of ethylene-alpha olefin copolymers, propylene-alpha olefin copolymers, and olefin block copolymers. In particular, in select embodiments, the channel fluid (212) may comprise one or more non-polar polyolefins.

In specific embodiments, polyolefins such as polypropylene, polyethylene, copolymers thereof, and blends thereof, as well as ethylene-propylene-diene terpolymers, may be used. In some embodiments, exemplary olefinic polymers include homogeneous polymers; high density polyethylene (HDPE); heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers; and high pressure, free radical polymerized ethylene polymers and copolymers such as low density polyethylene (LDPE) or ethylene vinyl acetate polymers (EVA).

In one embodiment, the ethylene-alpha olefin copolymer may, for example, be ethylene-butene, ethylene-hexene, or ethylene-octene copolymers or interpolymers. In other particular embodiments, the propylene-alpha olefin copolymer may, for example, be a propylene-ethylene or a propylene-ethylene-butene copolymer or interpolymer.

In certain other embodiments, the channel fluid (212) may, for example, be a semi-crystalline polymer and may have a melting point of less than 110° C. In another embodiment, the melting point may be from 25 to 100° C. In another embodiment, the melting point may be between 40 and 85° C.

In one particular embodiment, the channel fluid (212) is a propylene/α-olefin interpolymer composition comprising a propylene/alpha-olefin copolymer, and optionally one or more polymers, e.g. a random copolymer polypropylene (RCP). In one particular embodiment, the propylene/alpha-olefin copolymer is characterized as having substantially isotactic propylene sequences. "Substantially isotactic propylene sequences" means that the sequences have an isotactic triad (mm) measured by 13C NMR of greater than about 0.85; in the alternative, greater than about 0.90; in another alternative, greater than about 0.92; and in another alternative, greater than about 0.93. Isotactic triads are well-known in the art and are described in, for example, U.S.

Pat. No. 5,504,172 and International Publication No. WO 00/01745, which refer to the isotactic sequence in terms of a triad unit in the copolymer molecular chain determined by 13C NMR spectra.

The propylene/alpha-olefin copolymer may have a melt flow rate in the range of from 0.1 to 500 g/10 minutes, measured in accordance with ASTM D-1238 (at 230° C./2.16 Kg). All individual values and subranges from 0.1 to 500 g/10 minutes are included herein and disclosed herein; for example, the melt flow rate can be from a lower limit of 0.1 g/10 minutes, 0.2 g/10 minutes, or 0.5 g/10 minutes to an upper limit of 500 g/10 minutes, 200 g/10 minutes, 100 g/10 minutes, or 25 g/10 minutes. For example, the propylene/alpha-olefin copolymer may have a melt flow rate in the range of from 0.1 to 200 g/10 minutes; or in the alternative, the propylene/alpha-olefin copolymer may have a melt flow rate in the range of from 0.2 to 100 g/10 minutes; or in the alternative, the propylene/alpha-olefin copolymer may have a melt flow rate in the range of from 0.2 to 50 g/10 minutes; or in the alternative, the propylene/alpha-olefin copolymer may have a melt flow rate in the range of from 0.5 to 50 g/10 minutes; or in the alternative, the propylene/alpha-olefin copolymer may have a melt flow rate in the range of from 1 to 50 g/10 minutes; or in the alternative, the propylene/alpha-olefin copolymer may have a melt flow rate in the range of from 1 to 40 g/10 minutes; or in the alternative, the propylene/alpha-olefin copolymer may have a melt flow rate in the range of from 1 to 30 g/10 minutes.

The propylene/alpha-olefin copolymer has a crystallinity in the range of from at least 1 percent by weight (a heat of fusion of at least 2 Joules/gram) to 30 percent by weight (a heat of fusion of less than 50 Joules/gram). All individual values and subranges from 1 percent by weight (a heat of fusion of at least 2 Joules/gram) to 30 percent by weight (a heat of fusion of less than 50 Joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram) to an upper limit of 30 percent by weight (a heat of fusion of less than 50 Joules/gram), 24 percent by weight (a heat of fusion of less than 40 Joules/gram), 15 percent by weight (a heat of fusion of less than 24.8 Joules/gram) or 7 percent by weight (a heat of fusion of less than 11 Joules/gram). For example, the propylene/alpha-olefin copolymer may have a crystallinity in the range of from at least 1 percent by weight (a heat of fusion of at least 2 Joules/gram) to 24 percent by weight (a heat of fusion of less than 40 Joules/gram); or in the alternative, the propylene/alpha-olefin copolymer may have a crystallinity in the range of from at least 1 percent by weight (a heat of fusion of at least 2 Joules/gram) to 15 percent by weight (a heat of fusion of less than 24.8 Joules/gram); or in the alternative, the propylene/alpha-olefin copolymer may have a crystallinity in the range of from at least 1 percent by weight (a heat of fusion of at least 2 Joules/gram) to 7 percent by weight (a heat of fusion of less than 11 Joules/gram); or in the alternative, the propylene/alpha-olefin copolymer may have a crystallinity in the range of from at least 1 percent by weight (a heat of fusion of at least 2 Joules/gram) to 5 percent by weight (a heat of fusion of less than 8.3 Joules/gram). The crystallinity is measured via DSC method. The propylene/alpha-olefin copolymer comprises units derived from propylene and polymeric units derived from one or more alpha-olefin comonomers. Exemplary comonomers utilized to manufacture the propylene/alpha-olefin copolymer are C2, and C4 to C10 alpha-olefins; for example, C2, C4, C6 and C8 alpha-olefins.

The propylene/alpha-olefin copolymer comprises from 1 to 40 percent by weight of one or more alpha-olefin comonomers. All individual values and subranges from 1 to 40 weight percent are included herein and disclosed herein; for example, the comonomer content can be from a lower limit of 1 weight percent, 3 weight percent, 4 weight percent, 5 weight percent, 7 weight percent, or 9 weight percent to an upper limit of 40 weight percent, 35 weight percent, 30 weight percent, 27 weight percent, 20 weight percent, 15 weight percent, 12 weight percent, or 9 weight percent. For example, the propylene/alpha-olefin copolymer comprises from 1 to 35 percent by weight of one or more alpha-olefin comonomers; or in the alternative, the propylene/alpha-olefin copolymer comprises from 1 to 30 percent by weight of one or more alpha-olefin comonomers; or in the alternative, the propylene/alpha-olefin copolymer comprises from 3 to 27 percent by weight of one or more alpha-olefin comonomers; or in the alternative, the propylene/alpha-olefin copolymer comprises from 3 to 20 percent by weight of one or more alpha-olefin comonomers; or in the alternative, the propylene/alpha-olefin copolymer comprises from 3 to 15 percent by weight of one or more alpha-olefin comonomers.

The propylene/alpha-olefin copolymer has a molecular weight distribution (MWD), defined as weight average molecular weight divided by number average molecular weight (Mw/Mn) of 3.5 or less; in the alternative 3.0 or less; or in another alternative from 1.8 to 3.0.

Such propylene/alpha-olefin copolymers are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™.

In one embodiment, the propylene/alpha-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a C4-10 α-olefin; and containing an average of at least 0.001, preferably an average of at least 0.005 and more preferably an average of at least 0.01, long chain branches/1000 total carbons. The maximum number of long chain branches in the propylene/alpha-olefin copolymer is not critical, but typically it does not exceed 3 long chain branches/1000 total carbons. The term long chain branch, as used herein with regard to propylene/alpha-olefin copolymers, refers to a chain length of at least one (1) carbon more than a short chain branch, and short chain branch, as used herein with regard to propylene/alpha-olefin copolymers, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. Such propylene/alpha-olefin copolymers are further described in details in the U.S. Provisional Patent Application No. 60/988,999 and International Patent Application No. PCT/US08/082599, each of which is incorporated herein by reference.

In certain other embodiments, the channel fluid 12, e.g. propylene/alpha-olefin copolymer, may, for example, be a semi-crystalline polymer and may have a melting point of less than 110° C. In preferred embodiments, the melting point may be from 25 to 100° C. In more preferred embodiments, the melting point may be between 40 and 85° C.

In other selected embodiments, olefin block copolymers, e.g., ethylene multi-block copolymer, such as those described in the International Publication No. WO2005/090427 and U.S. Patent Application Publication No. US 2006/0199930, incorporated herein by reference to the extent describing such olefin block copolymers and the test methods for measuring those properties listed below for such polymers, may be used as the channel fluid (212). Such olefin block copolymer may be an ethylene/α-olefin interpolymer:

(a) having a Mw/Mn from about 1.7 to about 3.5, at least one melting point, Tm, in degrees Celsius, and a density, d, in grams/cubic centimeter, wherein the numerical values of Tm and d corresponding to the relationship:

$$Tm > -2002.9 + 4538.5(d) - 2422.2(d)2; \text{ or}$$

(b) having a Mw/Mn from about 1.7 to about 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$$Re > 1481 - 1629(d); \text{ or}$$

(d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of about 1:1 to about 9:1.

Such olefin block copolymer, e.g. ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, Mw/Mn, greater than about 1.3; or (b) have an average block index greater than zero and up to about 1.0 and a molecular weight distribution, Mw/Mn, greater than about 1.3.

In one embodiment, the channel fluid (212) may further comprise a blowing agent thereby facilitating the formation of a foam material. In one embodiment, the channel fluid (212) may be formed into a foam, for example a closed cell foam. In another embodiment, the channel fluid (212) may further comprise one or more fillers. Such fillers include, but are not limited to, natural calcium carbonates, including chalks, calcites and marbles, synthetic carbonates, salts of magnesium and calcium, dolomites, magnesium carbonate, zinc carbonate, lime, magnesia, barium sulphate, barite, calcium sulphate, silica, magnesium silicates, talc, wollastonite, clays and aluminum silicates, kaolins, mica, oxides or hydroxides of metals or alkaline earths, magnesium hydroxide, iron oxides, zinc oxide, glass or carbon fiber or powder, wood fiber or powder or mixtures of these compounds.

The films or foams according to the present disclosure may be used in packaging (e.g. reinforced thermoformed parts for trays, tape wrap, buckets, beakers, boxes); thermoformed boat hulls, building panels, seating devices, automotive body parts, fuselage parts, vehicle interior trim, and the like.

One or more inventive films or foams may form one or more layers in a multilayer structure, for example, a laminated multilayer structure or a coextruded multilayer structure. The films or foams may comprise one or more parallel rows of microcapillaries (channels as shown in FIG. 2B). Channels 20 (microcapillaries) may be disposed anywhere in matrix (218), as shown in FIGS. 2A-F.

Examples

Inventive film 1 was prepared according to the following process.

The matrix material comprised linear low density polyethylene (LLDPE), available under the tradename DOWLEX™ 2344 from The Dow Chemical Company, having a density of approximately 0.933 g/cm3, according to ASTM-D792 and a melt index (I2) of approximately 0.7 g/10 minutes, according to ISO 1133 at 190° C. and 2.16 kg, formed into microcapillary films via the inventive die having a width of 24 inches (60.96 cm) and 530 nozzles thereby forming a microcapillary film having a target thickness of approximately 2 mm having microcapillaries having a target diameter of about 1 mm, the film has a width in the range of about 20 inches (50.80 cm) and 530 capillaries parallel therein. The channel fluid disposed in microcapillaries was ambient air, approximately 25° C.

Inventive film 2 was prepared according to the following process.

The matrix material comprised of polypropylene homopolymer, available under the tradename Braskem PP H110-02N™ available from Braskem America Inc., a melt flow rate of approximately 2.0 g/10 min (230 C/2.16 Kg) according to ASTM D1238, formed into microcapillary films via the inventive die having a width of 24 inches (60.96 cm) and 530 nozzles thereby forming a microcapillary film having a target thickness of approximately 2 mm having microcapillaries having a target diameter of about 1 mm, the film has a width in the range of about 20 inches (50.80 cm) and 530 capillaries parallel therein. The channel fluid disposed in microcapillaries was ambient air, approximately 25° C.

The present disclosure may be embodied in other forms without departing from the spirit and the essential attributes thereof, and, accordingly, reference should be made to the appended claims, rather than to the foregoing specification, as indicating the scope of the disclosure.

Die Assembly

Figure 3:
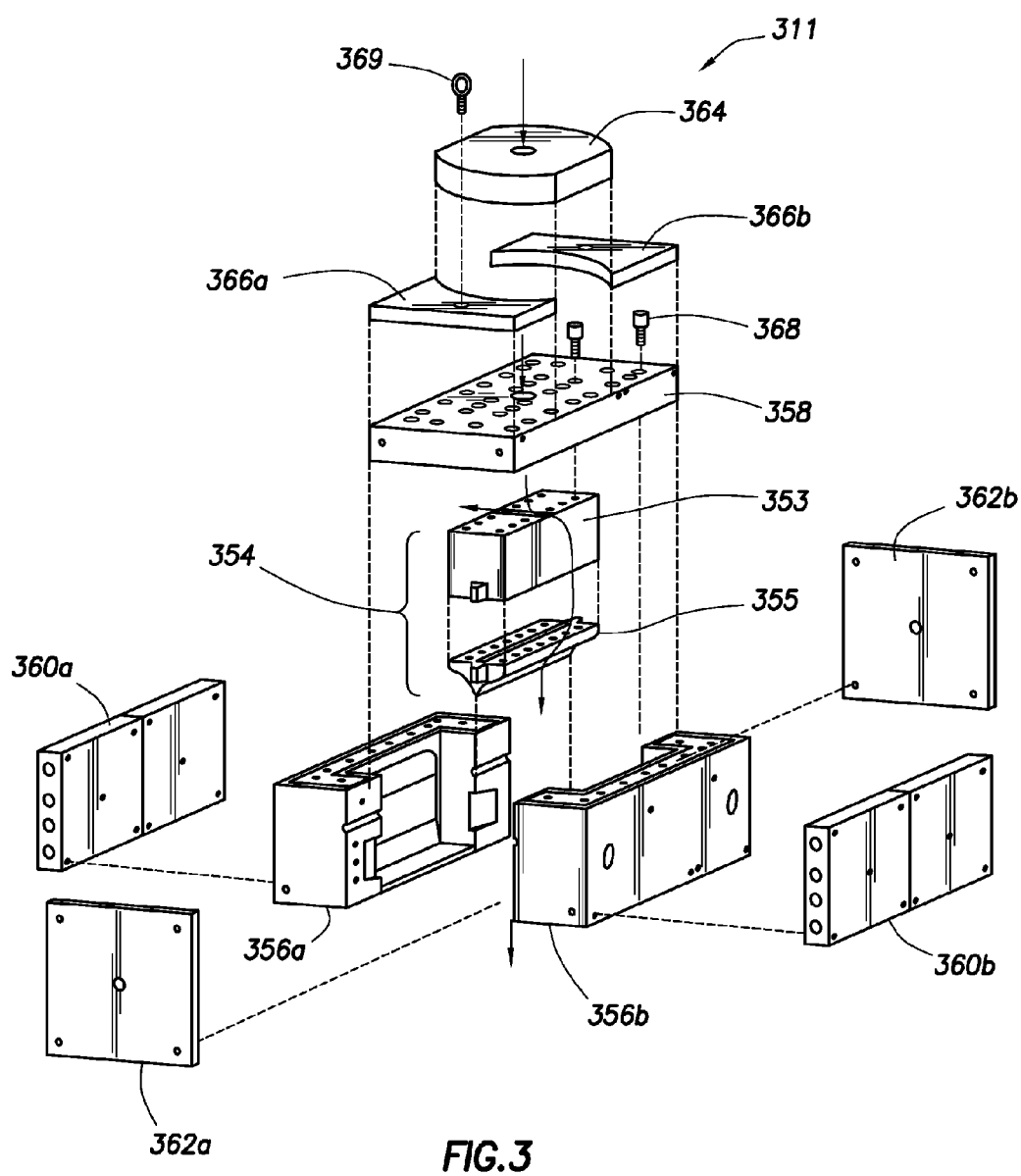
FIG. 3 is a perspective, exploded view of a die assembly.

FIG. 3 depicts an assembly view of a die assembly (311) usable as the die assembly (111) of FIG. 1. As shown in this figure, the die assembly (311) includes a manifold (354) receivably positionable between a pair of dies (356a,b). The manifold (354) includes a manifold intake (353) and a manifold outtake (355).

Material flows through the die assembly (311) via inlet (364), through top plate (358) around manifold (354) and through the dies (356a,b) as indicated by the arrows. The die assembly (311) may be configured to facilitate the flow of the material therethrough and to define the profile of the material as it exits the die assembly (311).

The die assembly (311) may be provided with various other die components, such as the top plate (358), heater plates (360a,b), insulation plates (362a,b), inlet (364) and support plates (366a,b). Fasteners, such as bolts (368) may also be provided to secure the die assembly (311) in place, and eyebolts (369) for lifting the die assembly (311). Various other components may be provided to secure the assembly in place, and to assure the material flow and profile output.

Figure 4A:
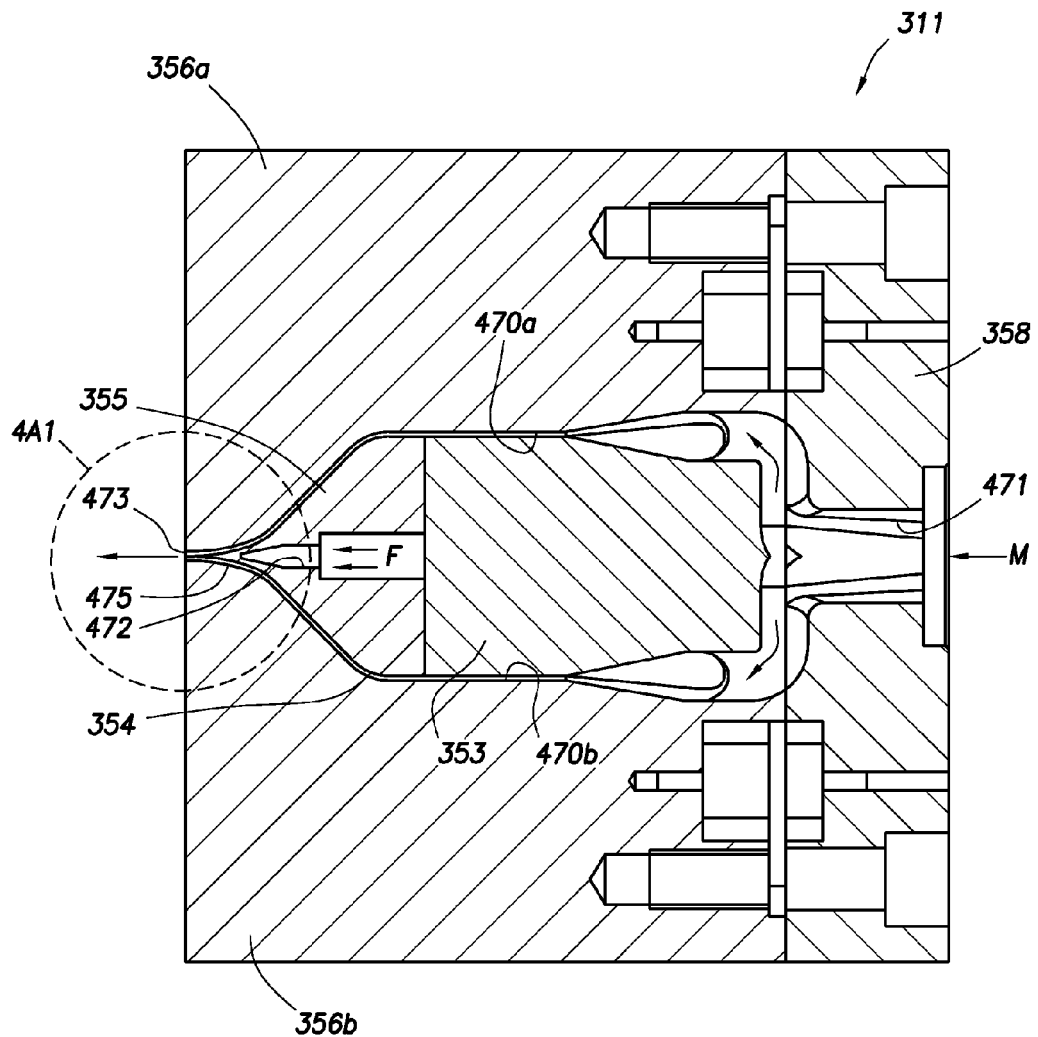
FIGS. 4A-4B are cross-sectional views of portions of various die assemblies.
Figure 4B:
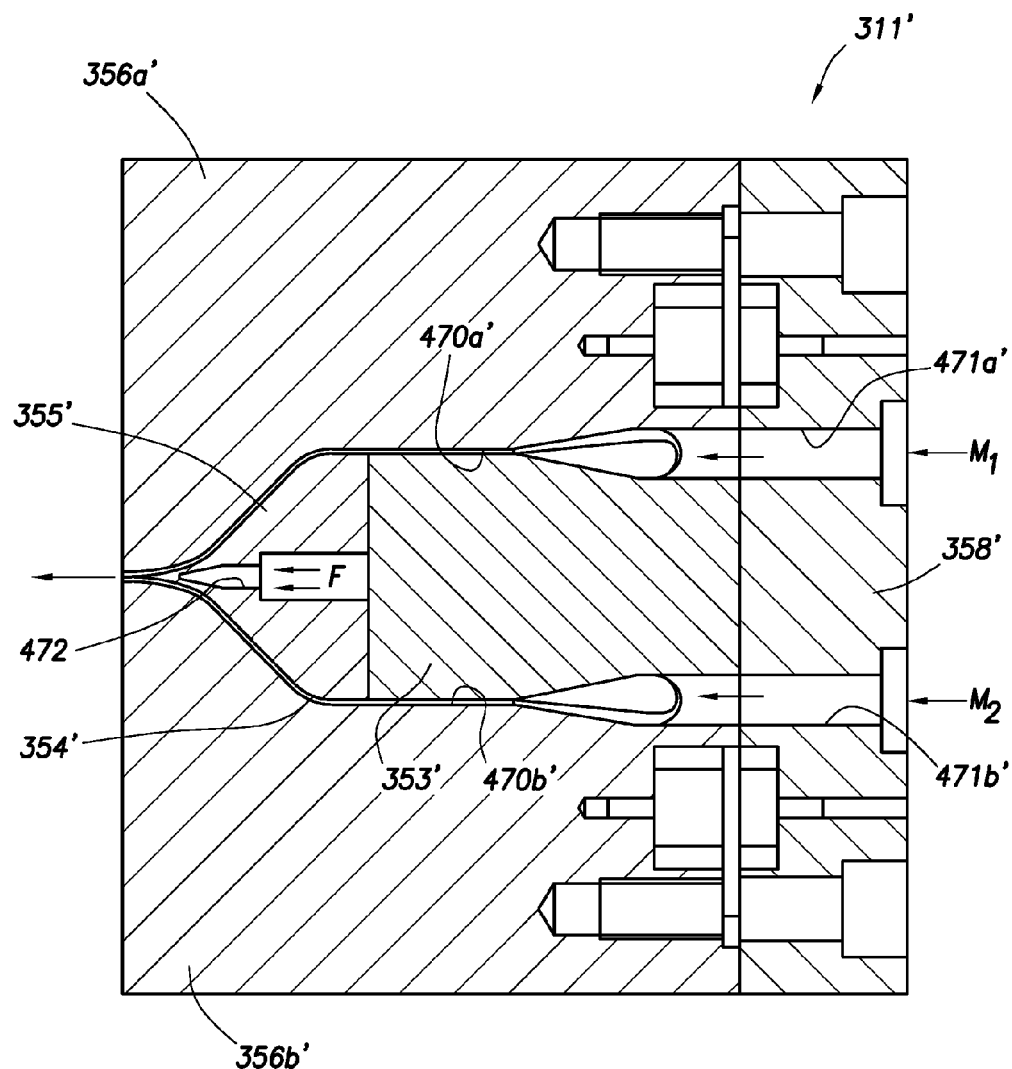

FIGS. 4A-4B depict operation of the die assembly (311) of FIG. 3. The die assembly (311) is a cross-sectional view of a portion of the die assembly (311) depicting the dies (356a,b) and manifold (354). As shown in FIG. 4A, a flow channel (470a) is defined between die (356a) and intake portion (353) and outtake portion (355) of the manifold (354), and a flow channel (470b) is defined between the die (356b) and manifold (354). In the version of the die assembly (311) of FIG. 4A, the dies (356a,b) and flow channels (470a,b) have the same shape and the manifold (354) is symmetrical.

The top plate 358 has a passage (471) for the passage of material M into the die assembly (311). As indicated by the arrows, the material M may be passed through passage (471), through the flow channels (470a,b), and out an outlet (473) of the die assembly (311). In this version, the material M passes through both flow channels and forms two layers of thermoplastic material that converges at the outlet (473). FIG. 4A1 shows a detailed view of the thermoplastic layers that are formed as the material converges at the outlet (473).

Various shapes of components of the die assembly (311') may be provided to define various shaped symmetrical or asymmetrical flow channels (470a',b'). These shapes may be selected to define the shape and structure of the film (see, e.g., FIGS. 2A-2F). For example, a different shaped die defines a different shaped flow channel between the die and the manifold. Optionally, the flow flannels (470a,b) may be varied by altering the shape of the manifold (354) to provide an asymmetrical shape. The shape of the flow channels and/or outlet may be used to define the profile of the resulting film.

The outlet (473) defines has an elongate opening that determines the profile and dimension of the film (210). For example, the width O of the outlet (473) defines the width W of the sheet of material (210) and the depth D of the outlet (473) defines the thickness T of the sheet of material (210) (see, e.g., FIG. 2C).

A fluid channel (472) is also defined in the manifold (354) between the flow channels (470a,b). The fluid channel (472) is in fluid communication with a fluid source (e.g., 119 of FIG. 1) and defines a fluid path for the flow of channel fluid F therethrough as indicated by the double arrows. The channel fluid F is emitted through a tip (475) of the manifold outtake (355) and between the thermoplastic layers emitted through the flow channels (470a,b).

FIG. 4B depicts an alternate version of the die assembly (311'). The die assembly (311') is the same as the die assembly (311) of FIG. 4A, except that the dies (356a',b') have separate flow channels (470a',b') about intake portion (353') and outtake portion (355') of manifold (354'). As shown in this figure, multiple materials M1, M2 may be passed through the die assembly (311') to generate layers of different materials. As demonstrated by FIGS. 4A and 4B, one or more materials may be passed through separate or conjoined flow channels. Additional layers may be formed using, for example, additional flow channels provided using additional manifolds. Multiple layers of material may also be produced from each of the flow channels 470a' and 470b'. The materials M1 and M2 may include one or more materials, or layers of material passing through one or both of the passages (471a',b'). In a given example, M1 may include multiple layers of material in a structured or layered flow. Such layers may be, for example, conical, linear, etc.

Figure 4C:
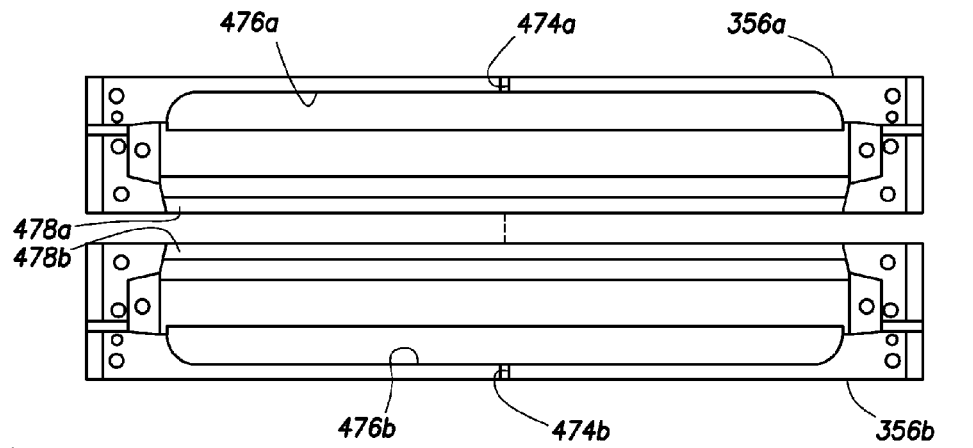
FIGS. 4C-4D show various views of pairs of dies.
Figure 4D:
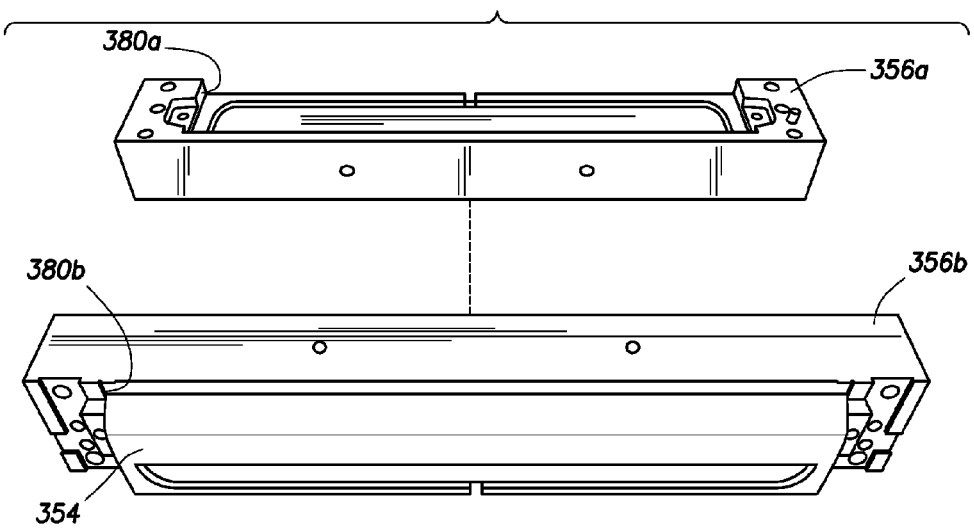

FIGS. 4C and 4D depict various views of the dies (356a,b). Each die has a flow inlet (474a,b) for receiving material from the extruder (e.g., FIG. 1). The material flows through flow inlets (474a,b), under pressure, and is spread through flow cavities (476a,b). The material conforms to the shape of the flow cavities (476a,b) and is passed out of the die (356a,b) along the elongated die outlet (478a,b). The dies (356a,b) are depicted as having gradations along the flow cavity (476a,b) that may be adjusted to the flow of material and/or shape of the produced film. The flow of material through the flow cavities (476a,b) may be configured such that the material spreads through the flow cavities (476a,b) and generates a desired output through die outlet (478a,b).

Each die (356a,b) also has a manifold receptacle (380a,b) for receiving the manifold (354). The flow cavities (476a,b) are defined in the space between the manifold (354) and the dies (356a,b).

FIGS. 5A-5E shows a portion of the die assembly (311) in a partially assembled position to reveal the multi-layered film (210) as it passes through the flow channel (470a) between the manifold (354) and the die (356a). As shown in these views, the material enters through inlet (580) and forms a sheet as it passes between the manifold (354) and the dies (356a,b). These figures also demonstrate that the die assembly (311) defines an inlet (580), flow channels (470a, b) and outlet (473) of a predetermined shape to define the shape of the extruded film.

As also shown in FIG. 5B, channel fluid F is passed through fluid inlet (582) transversely through the manifold (354). Referring to FIGS. 4A and 5B, the channel fluid F is passed into the manifold (354) and out the manifold outtake (355). The channel fluid F is emitted through the tip (475) and between layers of the thermoplastic material exiting the outlet (473).

Figure 5A:
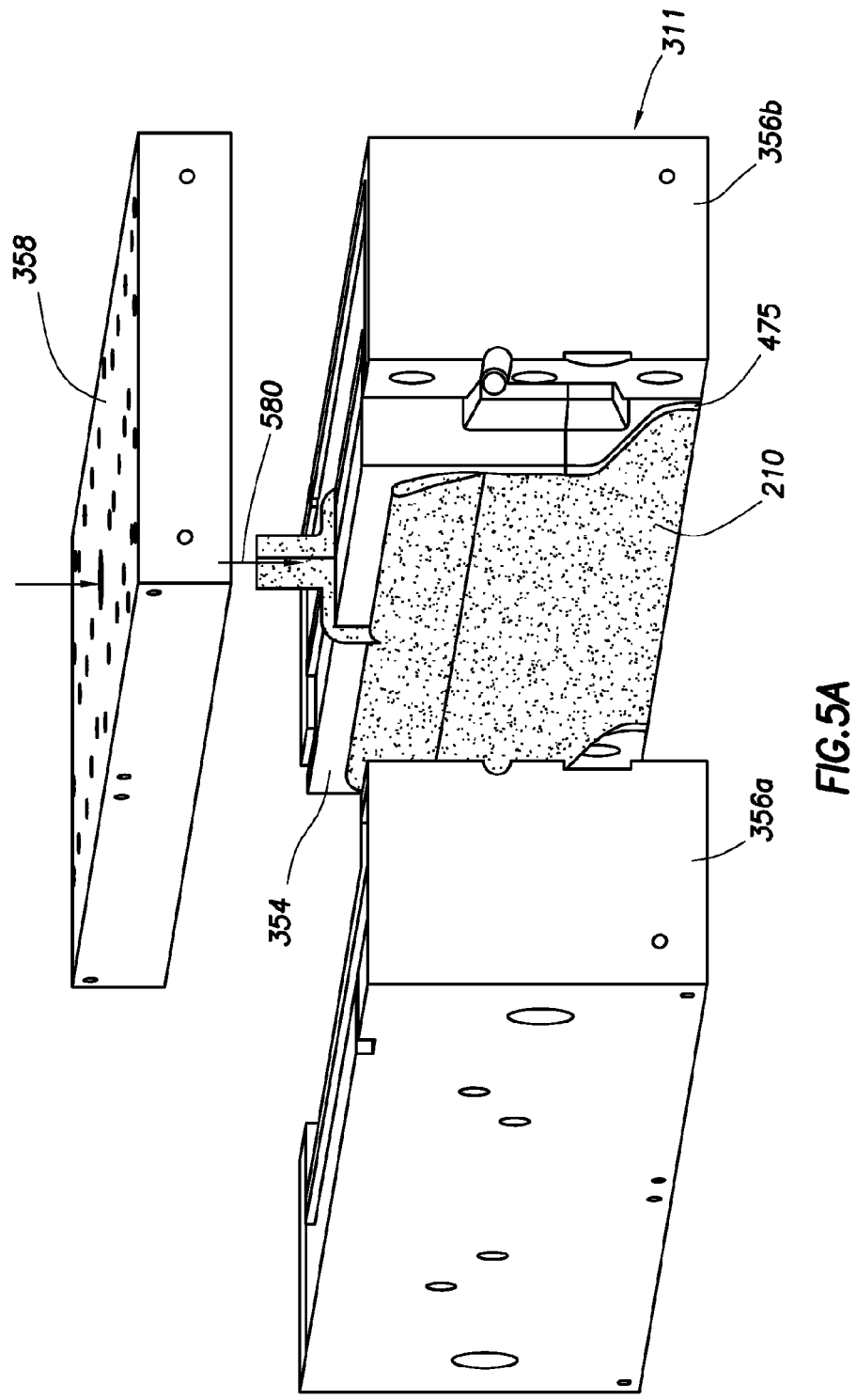
Figure 5C:
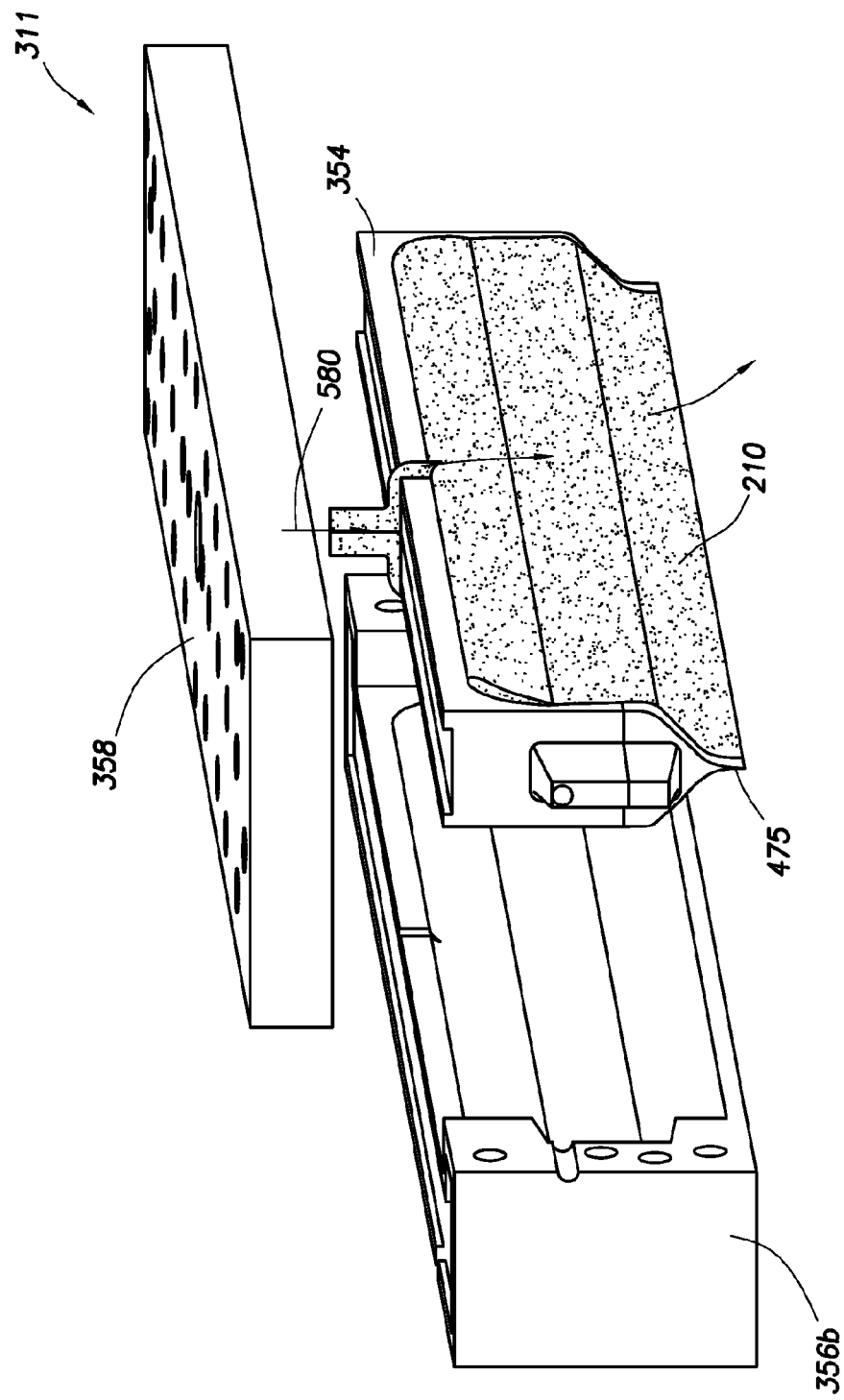
Figure 5D:
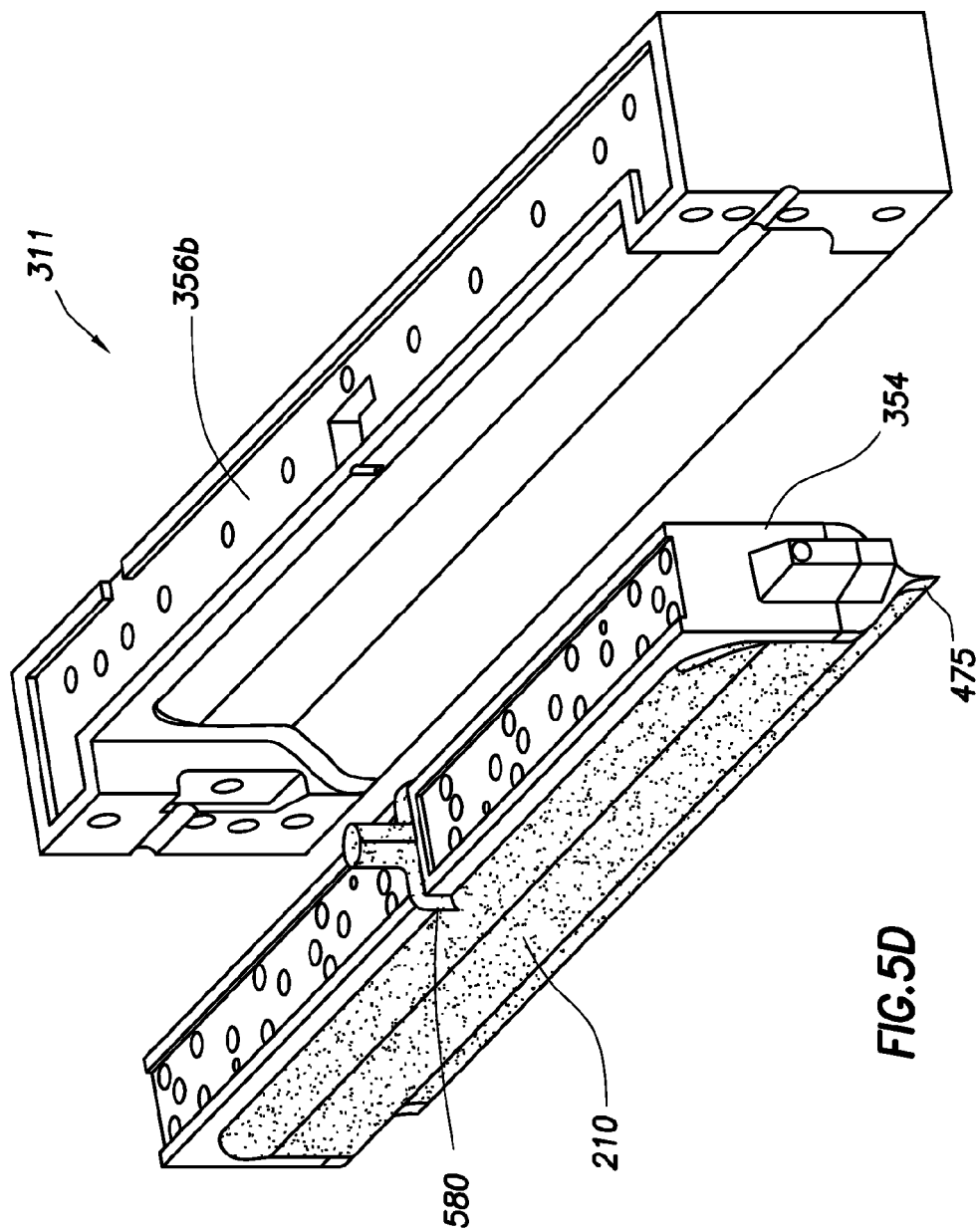
Figure 5E:
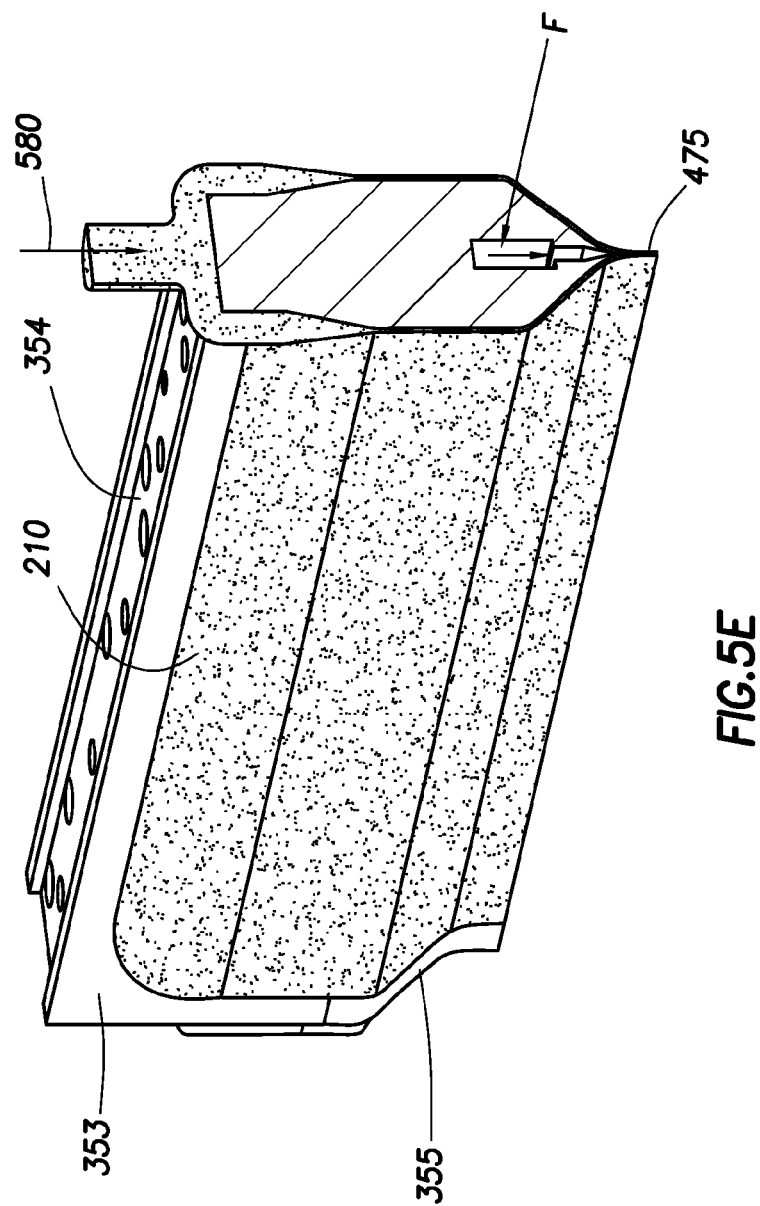

As seen in FIGS. 5B and 5E, the die assembly (311) is coupled to a fluid source (see, e.g., 119 of FIG. 1) for passing channel fluid F through the die assembly (311). The fluid source (119) is in fluid communication with the manifold outtake (355). The manifold outtake (355) emits the channel fluid F through the outlet (473) around which the molten thermoplastic material flows on either side thereof. As the molten thermoplastic material exits the outlet (473), the channel fluid F is emitted between the layers of the molten thermoplastic material thereby forming microcapillaries (e.g., channels 220 of FIG. 2B) filled with the channel fluid F.

Figure 5F:
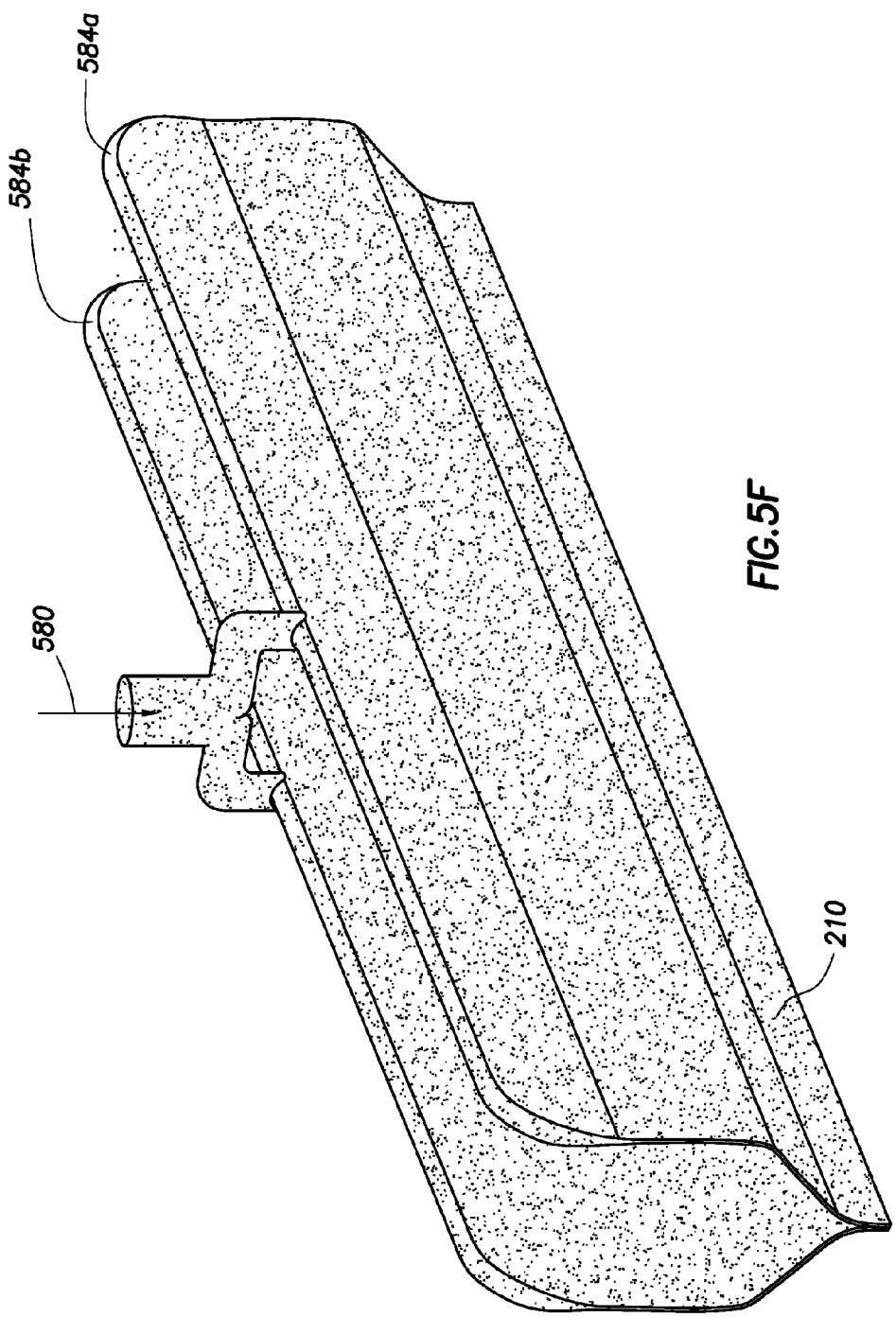
Figure 6C:
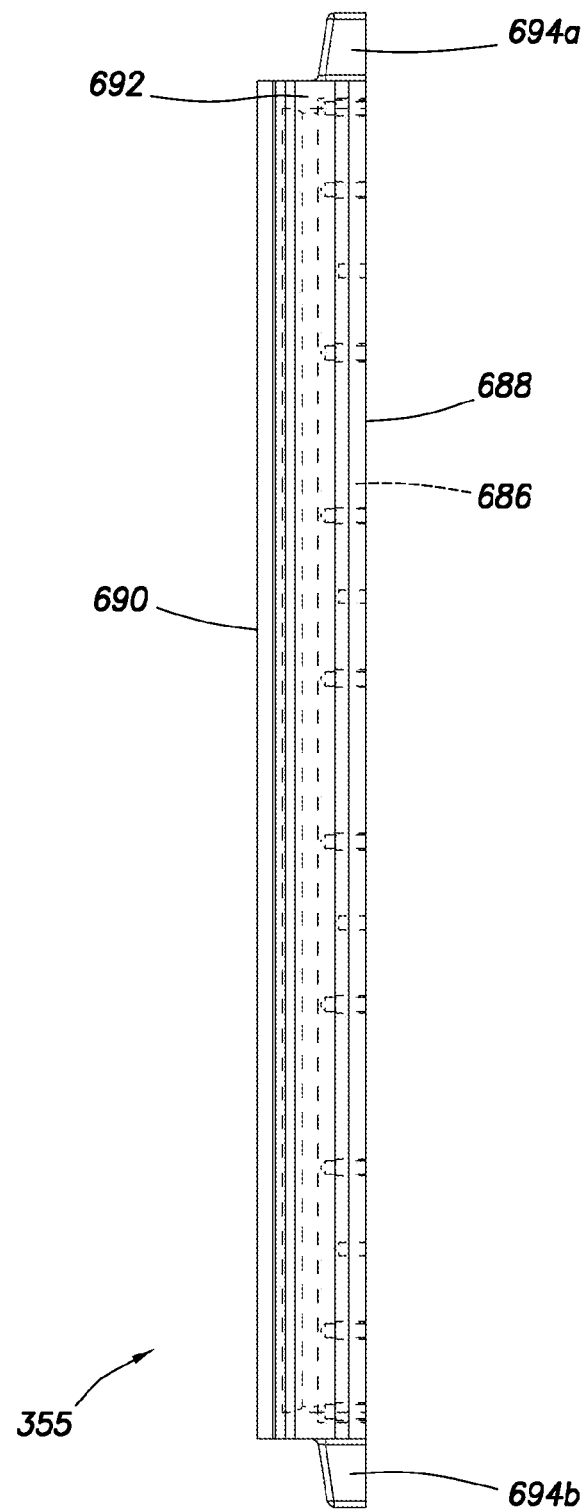
Figure 6D:
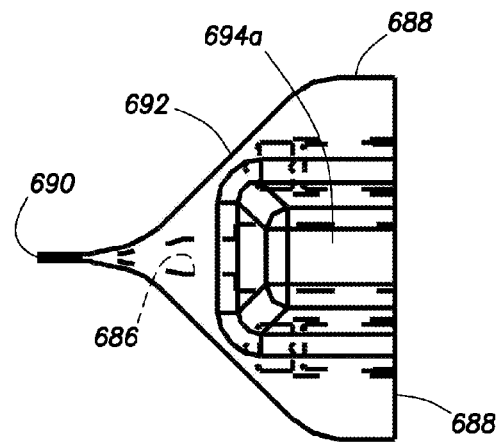
Figure 6F:
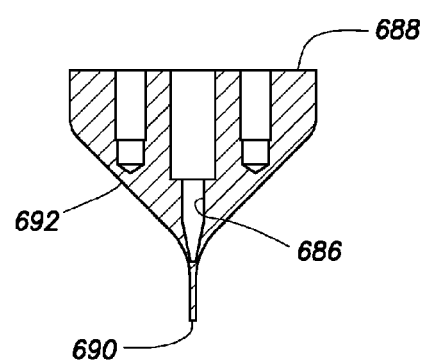
Figure 6E:
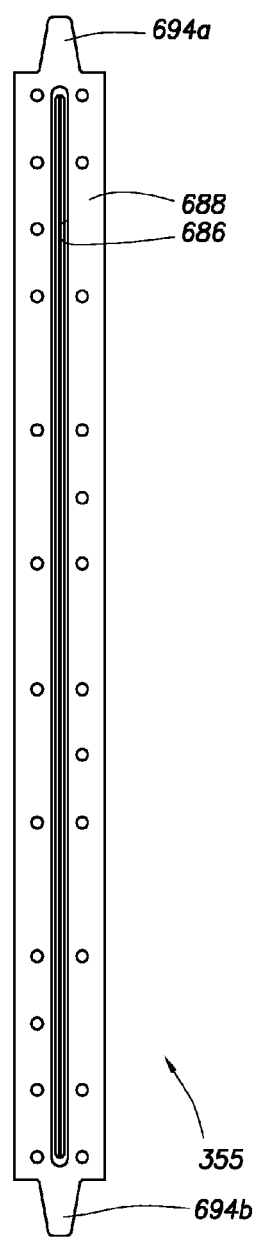
Figure 7A:
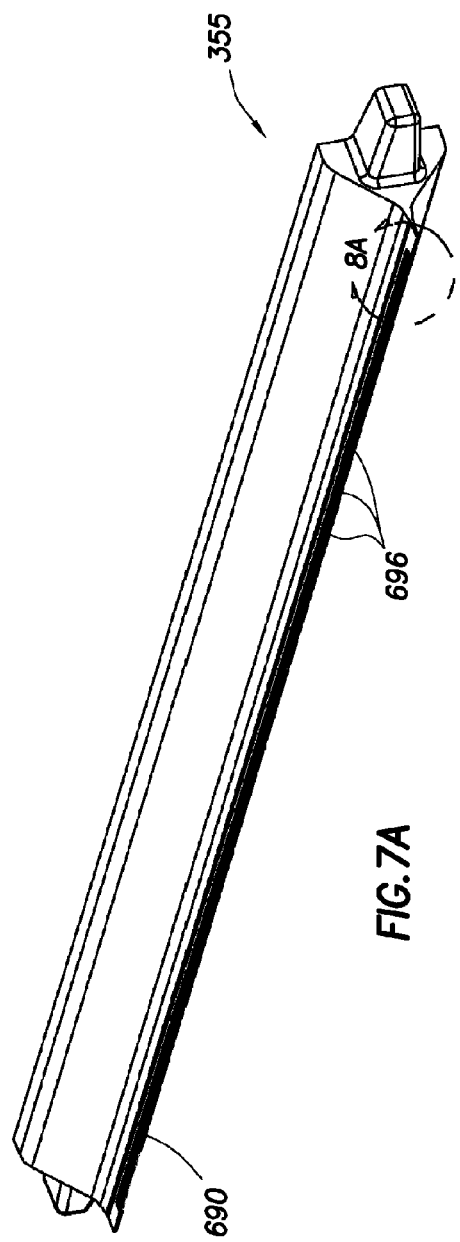
FIGS. 7A-7E are various views of a portion of an alternate manifold outtake.
Figure 7C:
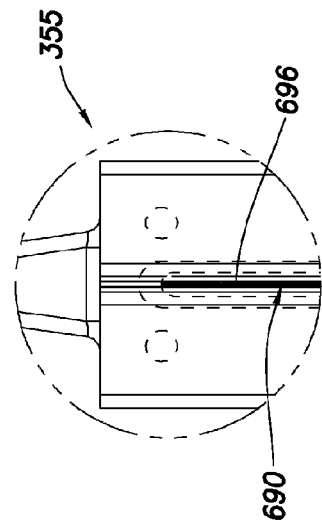
Figure 7B:
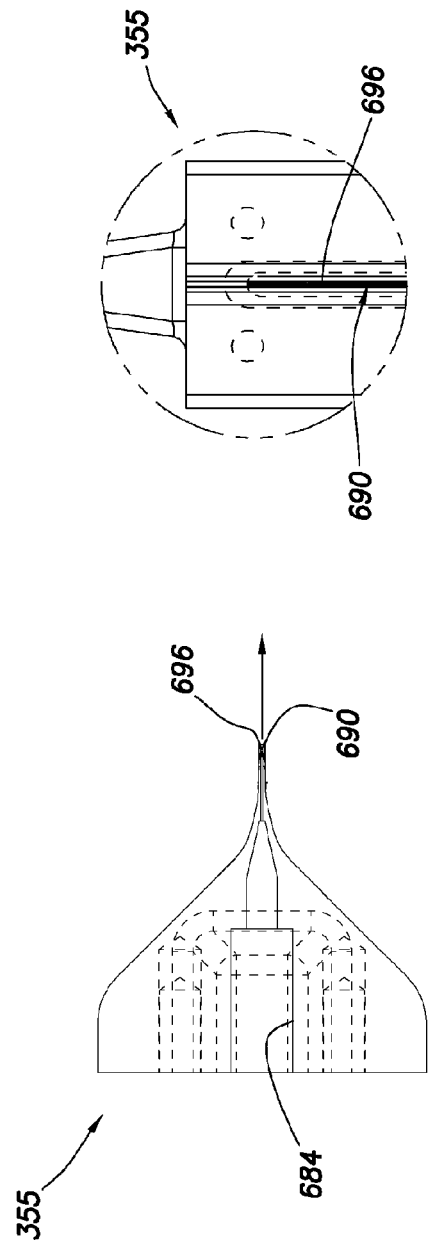
Figure 7D:
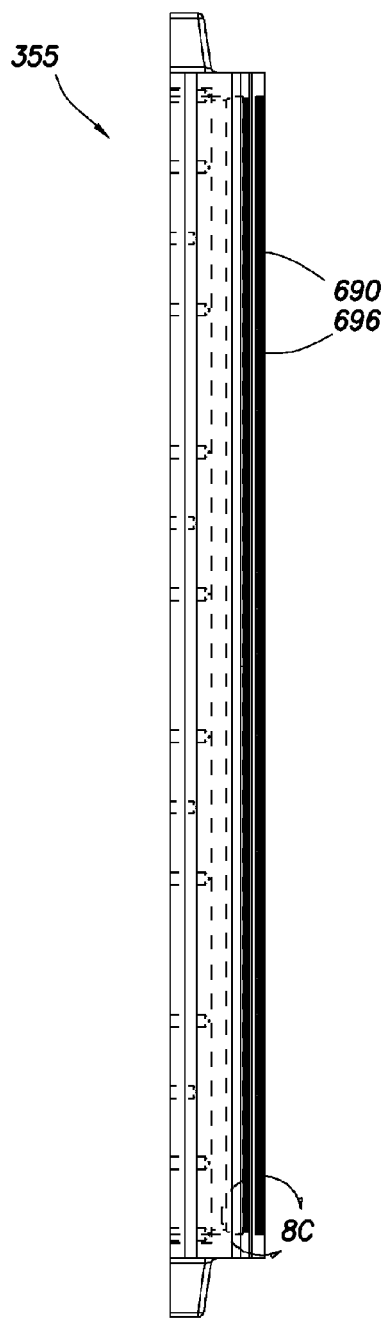
Figure 7E:
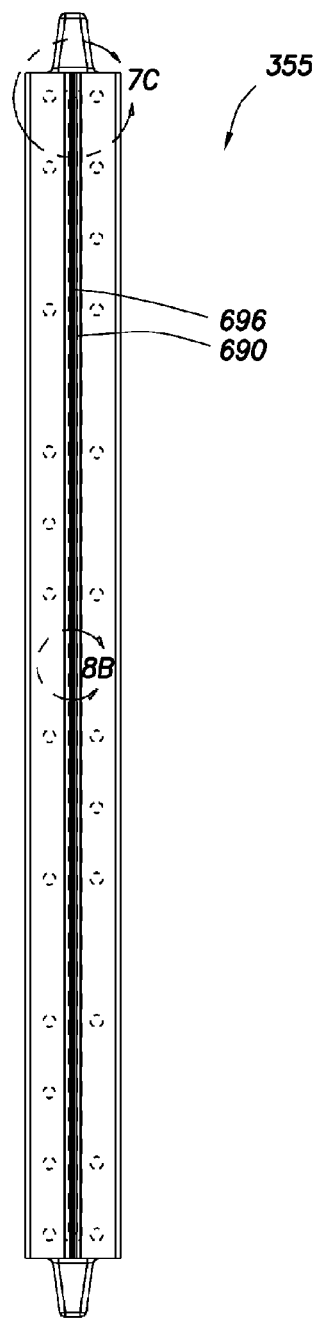

FIG. 5F shows the flow of the material (210) with the die assembly (311) removed. The flow of material (210) is defined by the flow cavities (see, e.g., 470a,b of FIG. 4A). The material enters the flow inlets (474a,b) (see, e.g., FIG. 4C) and fills the flow cavities (476a,b) to form the layers of material (584a,b) as shown in FIGS. 5A-5E. The layers of material (584a,b) advance along an outer surface of the manifold intake (353) and converge about a linear portion of the manifold outtake (355) at tip (475).

As shown by FIG. 5F, the layers of material (584a,b) may form a multi-layered sheet of film (210) upon convergence. The profile of the material is defined by the dimensions of the flow channels (470a,b) between the dies (356a,b) and the manifold (354), and by the outlet (473).

The geometry of the dies (356a,b) and manifold (354) may be selected to define the geometry of the flow channels (470a,b). The geometry of the flow channels may be adjusted to manipulate the flow of material passing therethrough. The flow of material may be manipulated such that material is selectively distributed through the flow channels (470a,b) to generate desired flow through the outlet (473). The flow of material may be distributed uniformly or non-uniformly through the flow channels (470a,b) to achieve the desired flow output and/or material profile. In cases where the width of the profile (e.g., W of FIG. 2C) is more than about 3 inches (76.2 cm), the configuration of the flow channels may need to be defined to provide for the desired flow. The profile may also be varied by the flow rates, pressures, temperatures, material properties, etc.

FIGS. 6A-6F depict various views of the manifold outtake (355) in greater detail. The manifold outtake (355) includes a rear portion (688) with a fluid channel (686) therethrough, and a nose (690) at an opposite end thereof. Ends (694a,b) may be provided for support within the die assembly (311). The manifold outtake (355) has a tapered outer surface (692) that extends from the rear portion (688) to the nose (690). The fluid channel (686) extends through the rear portion (688) and the nose (690) adjacent the elongate outlet (473) as shown in FIG. 4A.

Figure 8B:
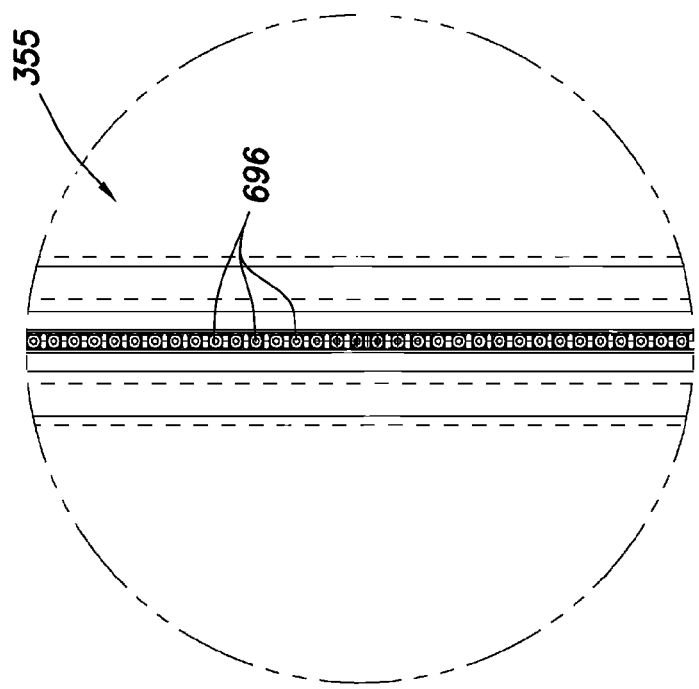
FIGS. 8A-8C are various views of a portion of the manifold outtake of FIG. 6A depicting nozzles thereon.
Figure 8A:
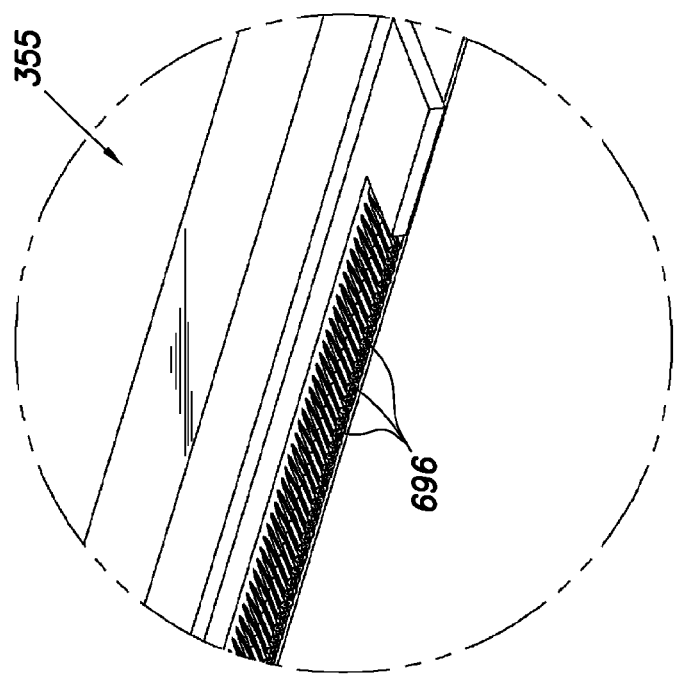
Figure 8C:
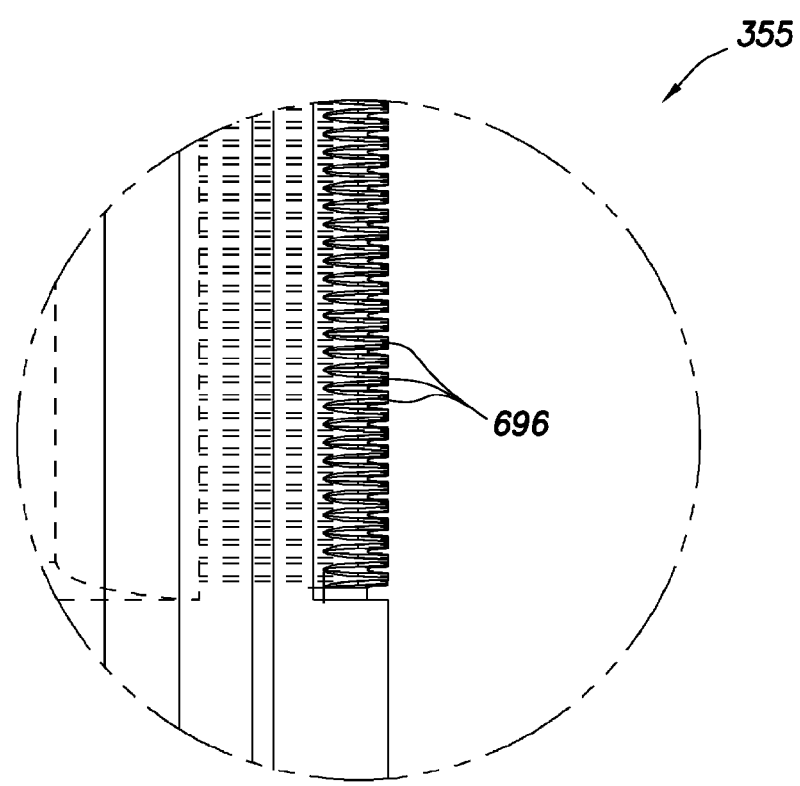

FIGS. 7A-7E depict various views of the manifold outtake (355) provided with nozzles (696). The nozzles (696) are depicted as being in a linear configuration along the elongate nose (690) of manifold outtake (355). While depicted in a linear configuration, the nozzles may be positioned about the inlet in a desired configuration. The fluid channel (686) is in fluid communication with the nozzles (696) for passing channel fluid therethrough as indicated by the arrow in FIG. 7B. The arrangement of the nozzles (696) along the nose (690) is shown in greater detail in FIGS. 8A-8C.

Figure 9A:
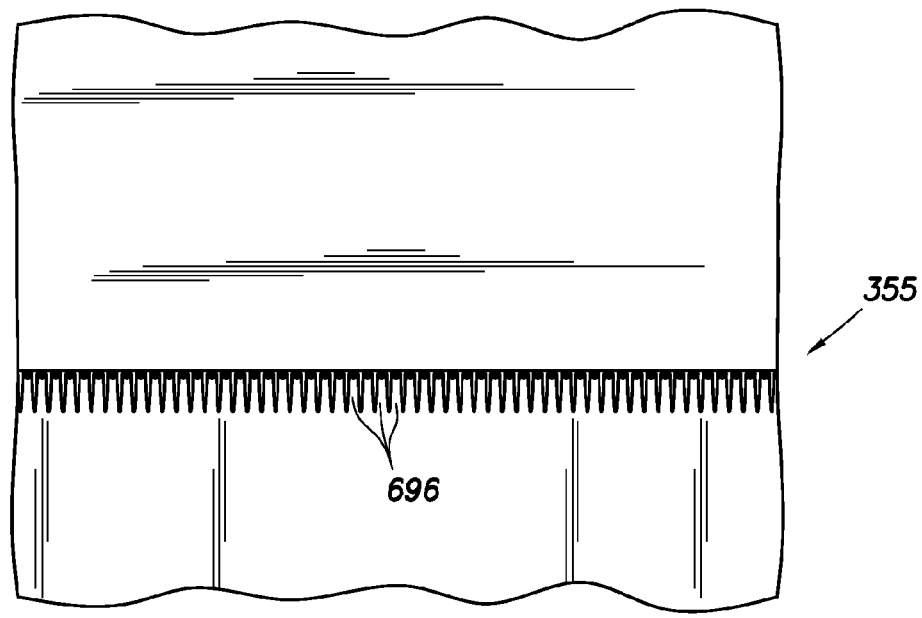
FIGS. 9A-9B are various detailed views of the nozzles.
Figure 9B:
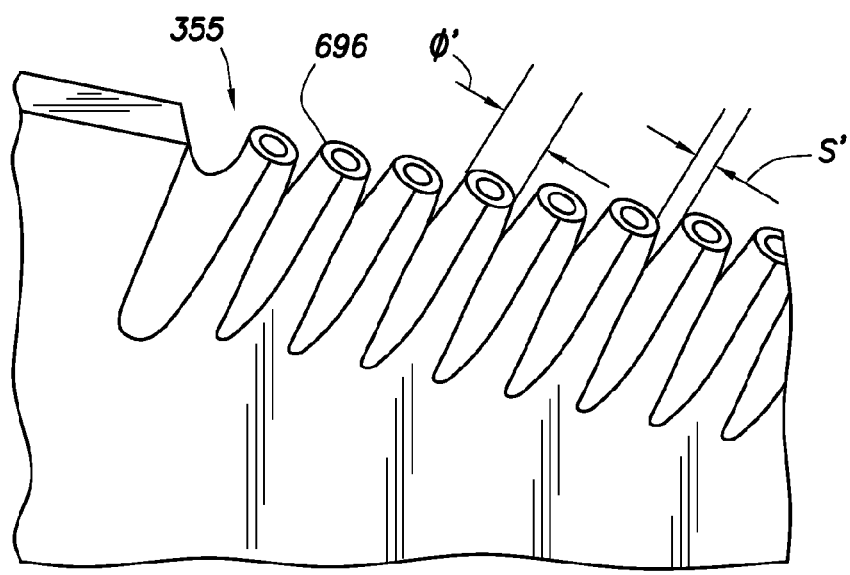

FIGS. 9A-9B show the nozzles (696) in greater detail. As shown in FIG. 9B, the nozzles (696) may have a circular shape. The nozzles (696) may also have a width or diameter φ' and spacing S' of a dimension sufficient to generate the multi-layer film (210) with the channel dimensions as desired (see, e.g., FIG. 2C). Various numbers, positions and shapes of nozzles (696) may be provided to achieve the desired configuration in the resulting film (210).

Figure 10:
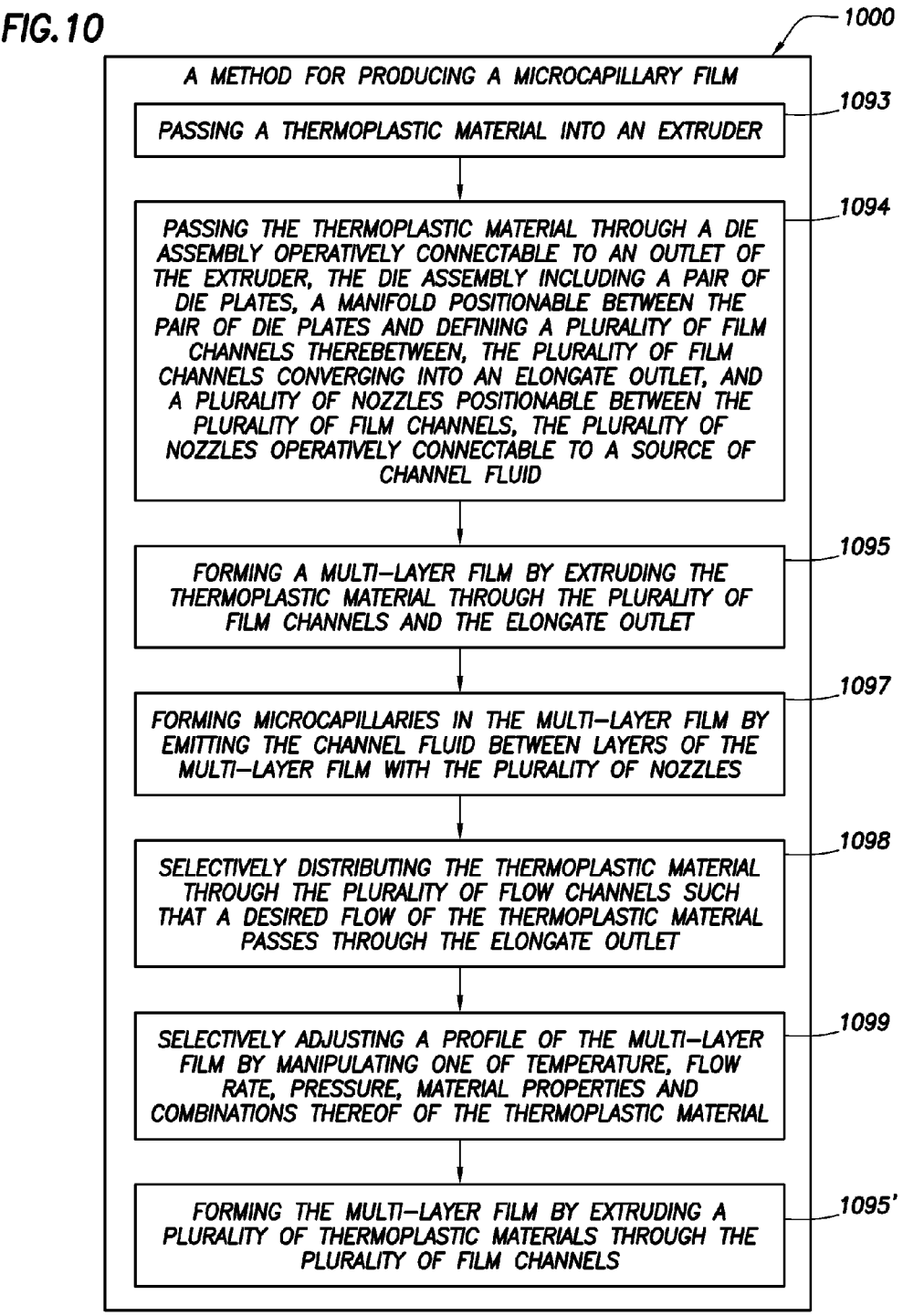
FIG. 10 is a flow chart depicting a method of producing a microcapillary film.

FIG. 10 is a flow chart depicting a method (1000) for producing a multi-layer, microcapillary film. The method involves passing (1093) a thermoplastic material into an extruder and passing (1094) the thermoplastic material through a die assembly operatively connectable to an outlet of the extruder. The die assembly may be a die assembly as described herein. The method may further involve forming (1095) a multi-layer film by extruding the thermoplastic material through the plurality of film channels and the elongate outlet and forming (1097) microcapillaries in the multi-layer film by emitting the channel fluid between layers of the multi-layer film with the plurality of nozzles.

The method may also involve selectively distributing (1099) the thermoplastic material through the plurality of flow channels such that a uniform flow of the thermoplastic material passes through the elongate outlet and/or selectively adjusting a profile of the multi-layer film by manipulating one of temperature, flow rate, pressure, material properties and combinations thereof of the thermoplastic material. The thermoplastic material may include a plurality of thermoplastic materials and forming multi-layer film may involve forming (1095A) the multi-layer film by extruding the plurality of thermoplastic materials through the plurality of film channels.

The method may be performed in any order and repeated as desired. A film may be produced by the method as described.

We claim:

1. A die assembly for producing a film, the die assembly operatively connectable to an extruder having a thermoplastic material passing therethrough, the die assembly comprising:
    a pair of die plates connectable together to define a manifold receptacle and an elongate outlet therebetween;
    a manifold positionable in the manifold receptacle between the pair of die plates and defining a plurality of film channels therebetween, the plurality of film channels converging into the elongate outlet, the thermoplastic material extrudable through the plurality of film channels and the elongate outlet to form a multi-layer film; and
    a plurality of nozzles positionable between the plurality of film channels and having a tip extending into the elongate outlet and to an exit of the elongate outlet, the plurality of nozzles operatively connectable to a source of channel fluid for emitting the channel fluid between layers of the multi-layer film whereby microcapillaries are formed in the multi-layer film.

2. The die assembly of claim 1, wherein the pair of die plates and the manifold are shaped to define the plurality of film channels such that the thermoplastic material is selectively distributed therethrough whereby a desired flow of the thermoplastic material passes through the elongate outlet.

3. The die assembly of claim 1, wherein the thermoplastic material comprises at least one matrix thermoplastic material extrudable through the plurality of film channels.

4. The die assembly of claim 1, further comprising at least one thermoplastic material inlet in fluid communication with the plurality of film channels.

5. The die assembly of claim 1, wherein the manifold comprises a manifold intake and a manifold outtake.

6. The die assembly of claim 5, wherein the plurality of nozzles are positionable about an exit end of the manifold outtake.

7. The die assembly of claim 1, wherein the manifold has a channel fluid passage in fluid communication with the plurality of nozzles for passing the channel fluid therethrough.

8. The die assembly of claim 1, wherein the plurality of film channels has one of a same shape and a different shape.

9. The die assembly of claim 1, wherein the elongate outlet has a width of at least 3 inches (7.62 cm).

10. The die assembly of claim 1, further comprising at least one plate about an outer surface thereof.

11. An extruder for producing a thermoplastic material film, comprising:

a housing having an inlet for receiving a thermoplastic material; a driver positionable in the housing and advancing the thermoplastic material through the housing; a die assembly operatively connectable to an elongate outlet of the housing, the die assembly comprising: a pair of die plates;

a manifold positionable between the pair of die plates and defining a plurality of film channels therebetween, the plurality of film channels converging into an elongate outlet, the thermoplastic material extrudable through the plurality of film channels and the elongate outlet to form a multi-layer film; and a plurality of nozzles positionable between the plurality of film channels, and having a tip extending into the elongate outlet and to an exit of the elongate outlet, the plurality of nozzles operatively connectable to a source of channel fluid for emitting the channel fluid between layers of the multi-layer film whereby microcapillaries are formed in the multi-layer film.

12. The extruder of claim 11, wherein the channel fluid comprises one of air, gas, thermoplastic material and combinations thereof.

13. The extruder of claim 11, further comprising a hopper for collecting and distributing the thermoplastic material through the inlet.

14. The extruder of claim 11, wherein the driver is at least one screw rotationally positionable in the housing.

15. The die assembly of claim 1, further comprising heater plates positioned about the die plates.

16. The die assembly of claim 1, further comprising support plates about the die plates.

17. The die assembly of claim 1, wherein the die plates have different inner surfaces defining asymmetric portions of the manifold receptacle.

18. The die assembly of claim 1, wherein the source of the channel fluid defines a fluid path for passing one of air, gas, fluid, thermoplastic material, and combinations thereof.

* * * * *